United States Patent
Ellingson

(10) Patent No.: US 10,077,794 B2
(45) Date of Patent: Sep. 18, 2018

(54) APPARATUS FOR MOUNTING ENCLOSURES AND FIXTURES AND ELECTRONICS CONTAINED THEREIN

(71) Applicant: Jeffrey S. Ellingson, Woodbury, MN (US)

(72) Inventor: Jeffrey S. Ellingson, Woodbury, MN (US)

( * ) Notice: Subject to any disclaimer, the term of this patent is extended or adjusted under 35 U.S.C. 154(b) by 0 days.

(21) Appl. No.: 15/136,805

(22) Filed: Apr. 22, 2016

(65) Prior Publication Data
US 2016/0238056 A1     Aug. 18, 2016

Related U.S. Application Data

(63) Continuation-in-part of application No. 14/489,413, filed on Sep. 17, 2014, now abandoned.

(60) Provisional application No. 61/878,629, filed on Sep. 17, 2013.

(51) Int. Cl.
| F16B 35/00 | (2006.01) |
| F16B 33/02 | (2006.01) |
| F16B 43/00 | (2006.01) |
| F16B 35/06 | (2006.01) |
| F16B 33/00 | (2006.01) |
| F16B 5/02  | (2006.01) |

(52) U.S. Cl.
CPC ............ *F16B 33/02* (2013.01); *F16B 5/0275* (2013.01); *F16B 33/004* (2013.01); *F16B 35/00* (2013.01); *F16B 35/06* (2013.01); *F16B 43/00* (2013.01)

(58) Field of Classification Search
CPC ...... F16B 5/0275; F16B 33/004; F16B 33/02; F16B 35/00; F16B 35/04; F16B 35/06; F16B 43/00

USPC .................................................. 411/388, 389
See application file for complete search history.

(56) References Cited

U.S. PATENT DOCUMENTS

| 335,395 | A | * | 2/1886 | Stone ........................ A01L 7/04 168/29 |
| 1,672,879 | A | * | 6/1928 | Campbell, Jr. ........ F16L 15/006 285/148.4 |
| 2,053,478 | A |   | 9/1936 | Horton |
| 3,396,996 | A |   | 8/1968 | Raptis |
| 3,429,351 | A | * | 2/1969 | Szalanczy ........... F16B 13/0825 411/259 |
| 3,897,713 | A |   | 8/1975 | Gugle |
| 4,050,833 | A |   | 9/1977 | Briles |
| 4,077,299 | A |   | 3/1978 | King |

(Continued)

OTHER PUBLICATIONS

Final Office Action, dated Oct. 22, 2015,, U.S. Appl. No. 14/489,413, 14 pages.

(Continued)

*Primary Examiner* — Roberta S Delisle
(74) *Attorney, Agent, or Firm* — Krenz Patent Law, LLC

(57) ABSTRACT

A stud for mounting an enclosure having a body with a first diameter, a length, a top, and a bottom. A head is connected to the top of the cylindrical body and extends beyond an outer surface of the cylindrical body. A cylindrical extension is connected to the bottom of the cylindrical body having a second diameter less than the first diameter, and an outer surface of the cylindrical extension is threaded. The cylindrical body includes a threaded cylindrical bore having an opening in the top of the cylindrical body, and the threaded cylindrical bore extends into the cylindrical body.

19 Claims, 16 Drawing Sheets

(56) References Cited

U.S. PATENT DOCUMENTS

| | | | |
|---|---|---|---|
| 4,223,585 A | 9/1980 | Barth et al. | |
| 4,348,141 A | 9/1982 | Dahl | |
| 4,911,592 A * | 3/1990 | Muller | B23P 19/062 29/432.2 |
| 4,983,084 A | 1/1991 | Gray | |
| 5,333,976 A | 8/1994 | Dobbrunz | |
| 5,788,441 A | 8/1998 | Karabestos et al. | |
| 5,810,505 A | 9/1998 | Henriott et al. | |
| 6,053,653 A | 4/2000 | Tanaka et al. | |
| 6,299,397 B1 | 10/2001 | Mengel | |
| 6,601,885 B1 | 8/2003 | Yiu | |
| 6,679,668 B2 | 1/2004 | Martin et al. | |
| 6,811,364 B2 * | 11/2004 | Kelzer | B23B 31/1122 411/383 |
| 7,241,097 B2 * | 7/2007 | Dembowsky | F16B 5/0233 411/34 |
| 7,624,618 B2 * | 12/2009 | Bader | F01M 11/0408 116/104 |
| 9,488,212 B2 * | 11/2016 | Hsieh | F16B 35/00 |
| 2008/0050199 A1 | 2/2008 | Park | |
| 2009/0060682 A1 | 3/2009 | Yeh et al. | |
| 2013/0223953 A1 * | 8/2013 | Thompson | F16B 37/14 411/34 |
| 2015/0322662 A1 * | 11/2015 | Schuster | F16B 35/00 29/890.141 |

OTHER PUBLICATIONS

Non-final Office Action, dated Jul. 2, 2015, U.S. Appl. No. 14/489,413, 10 pages.

Google Search—mounting studs, Retrieved Aug. 20, 2014 search performed on Internet search engine information, available at: https://www.google.com/search?q=mounting+studs&tbm=isch&imgil=B6UW3qa_6eVfl . . . , 10 pages.

* cited by examiner

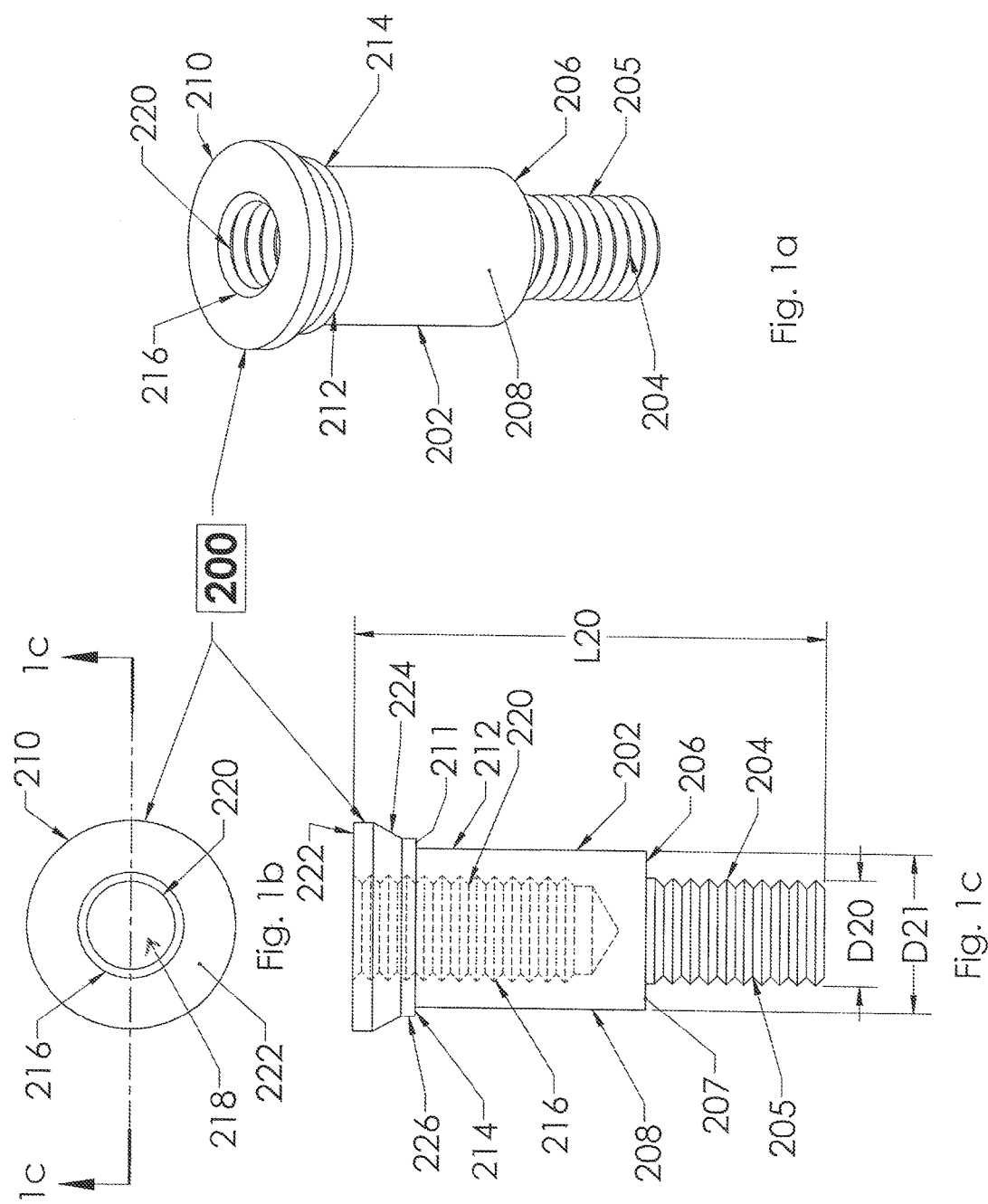

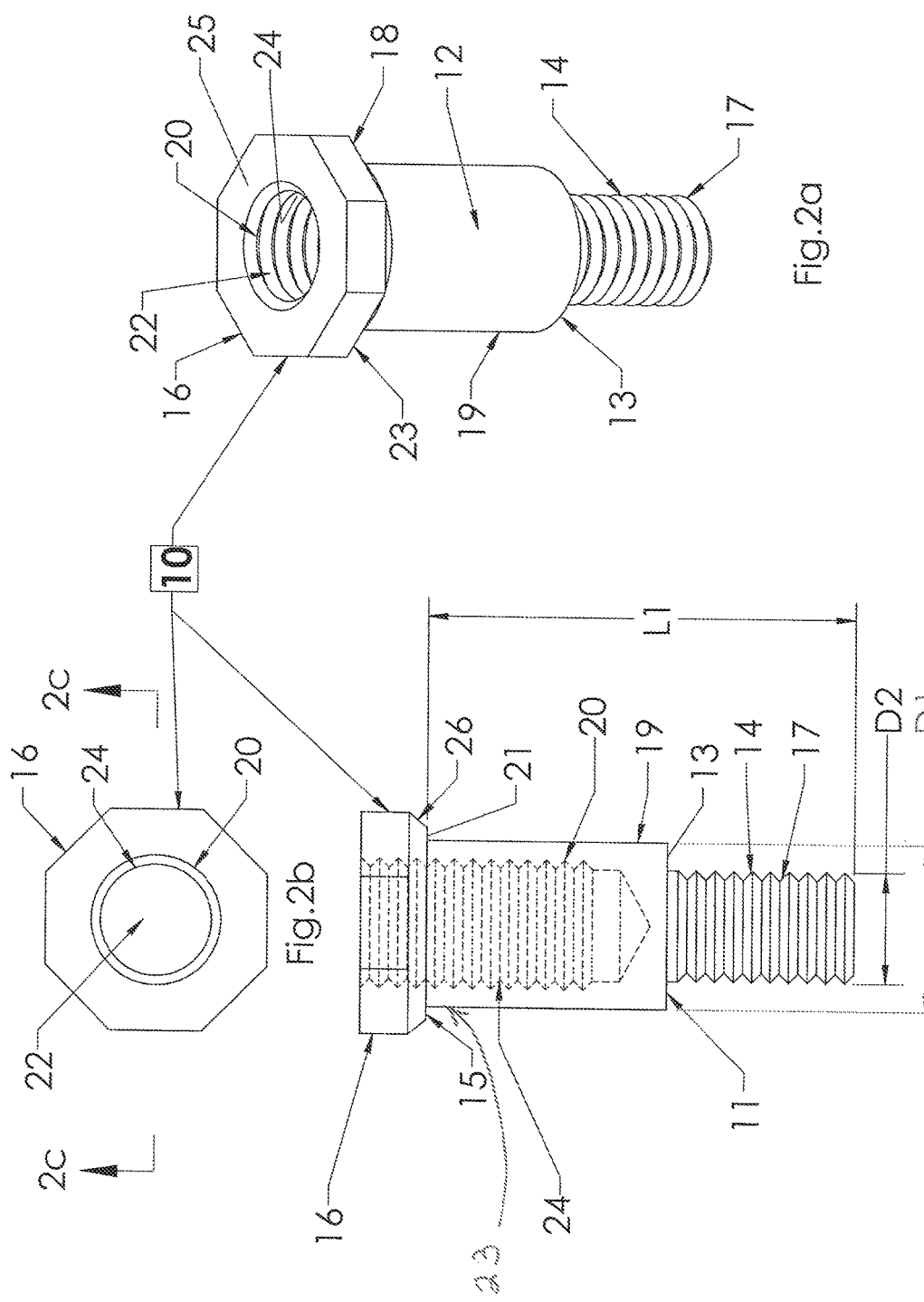

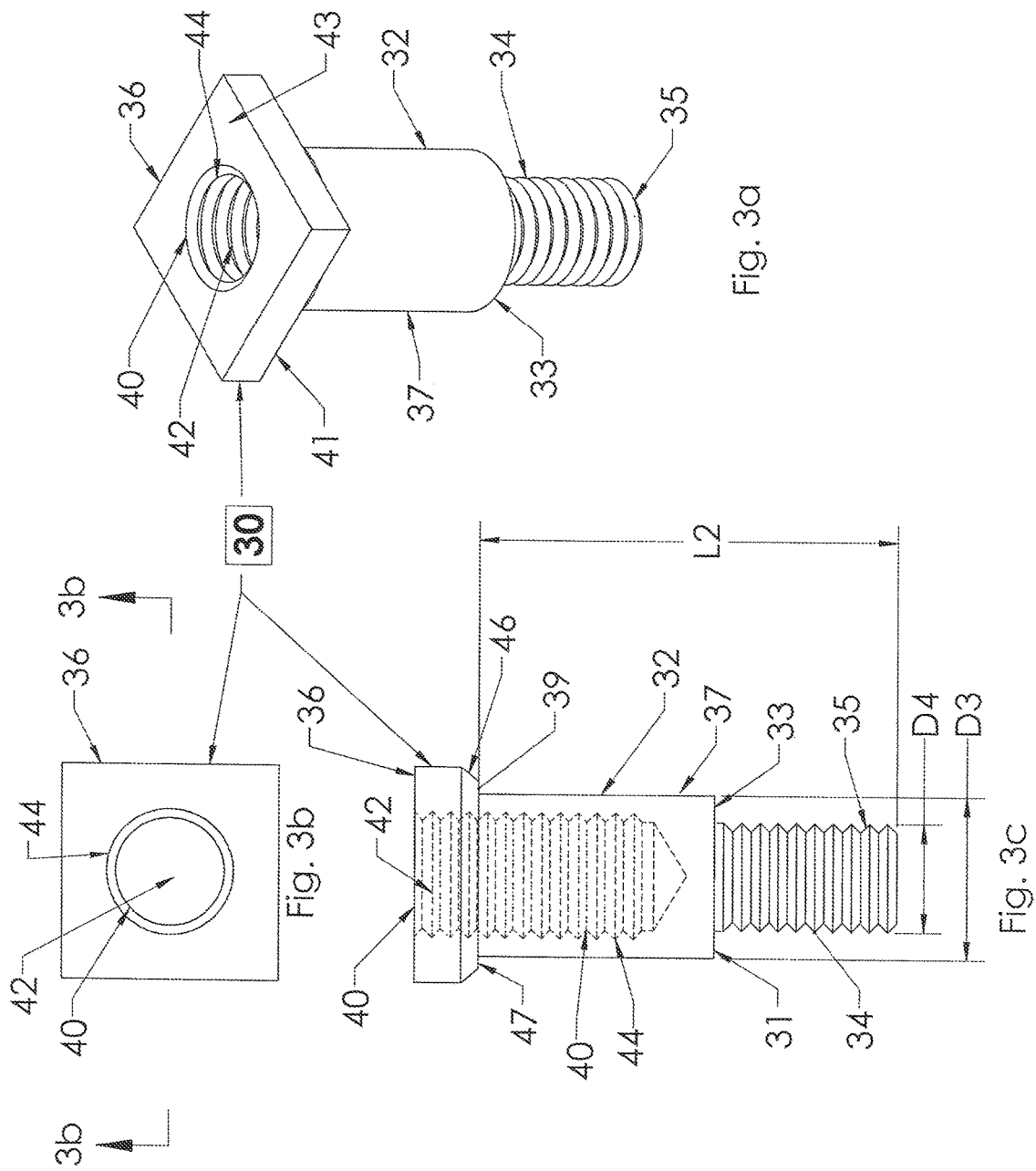

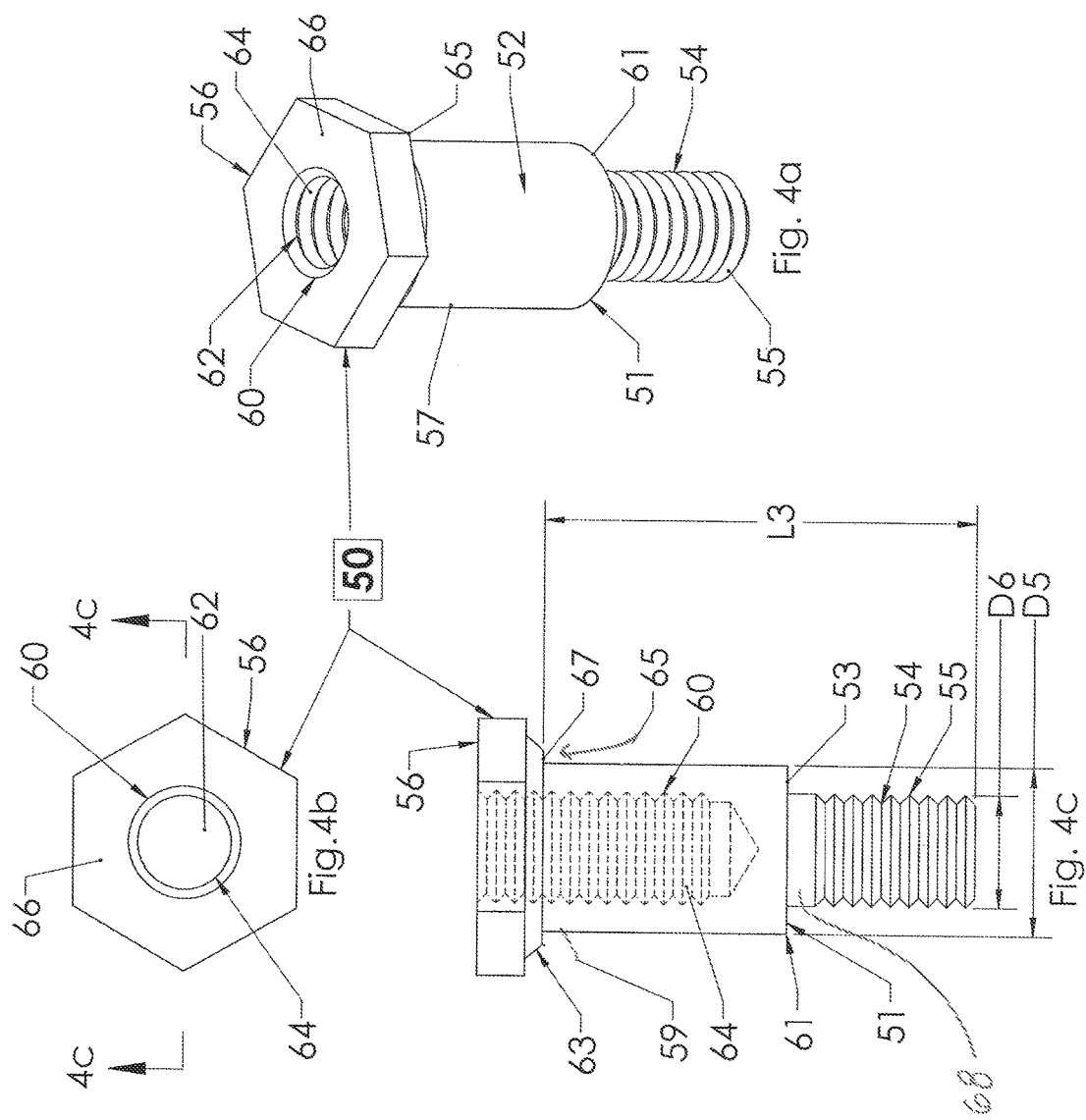

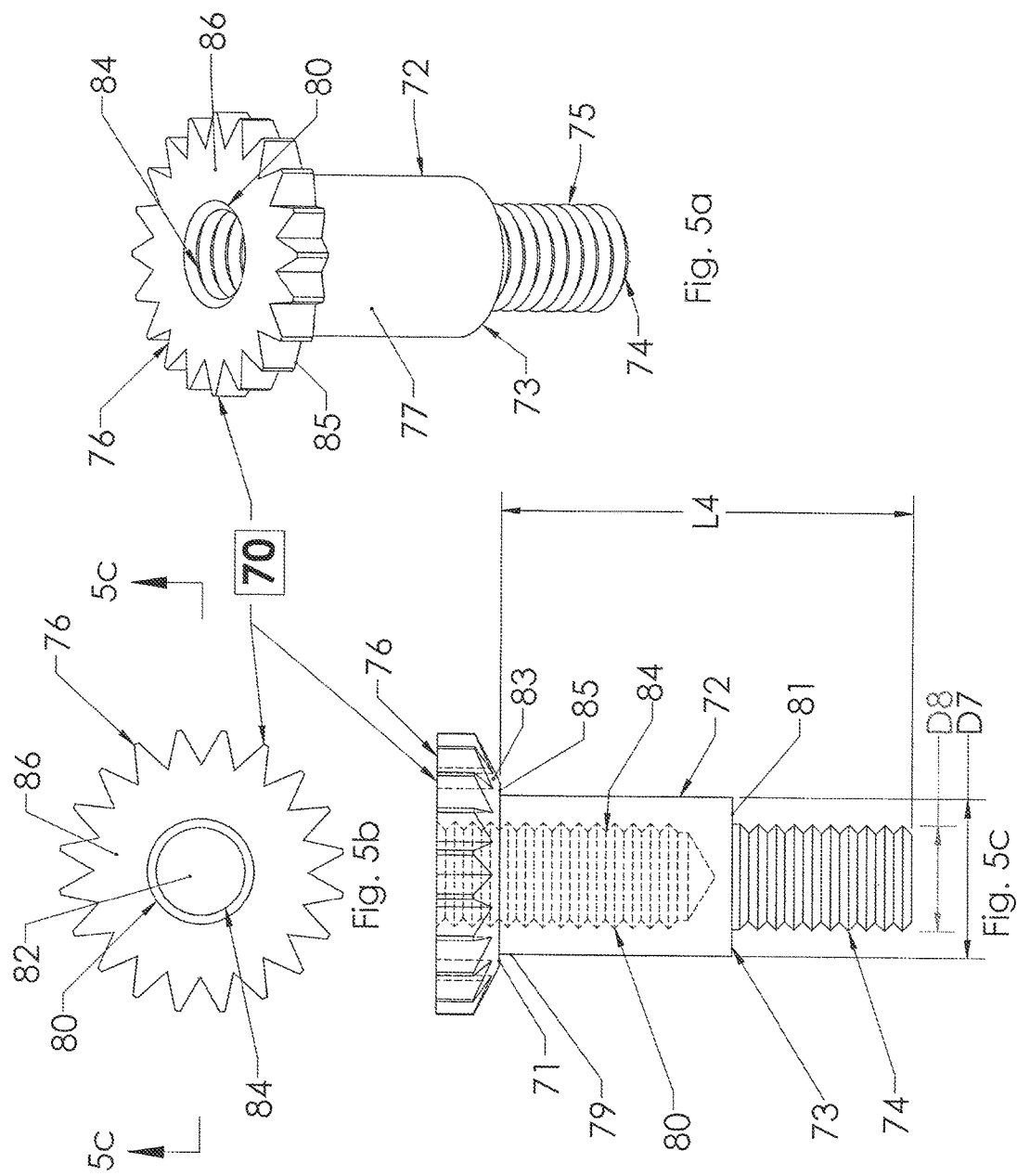

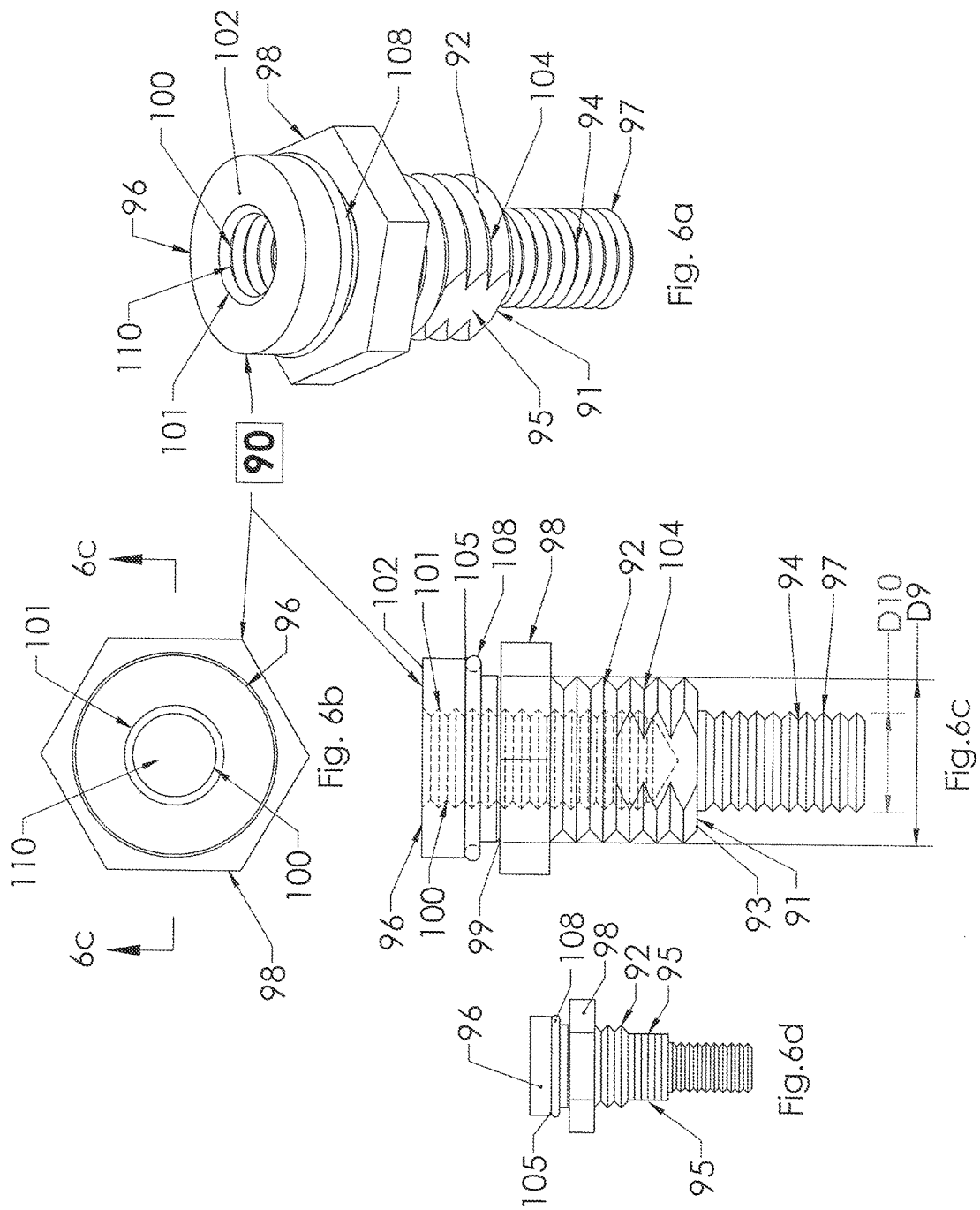

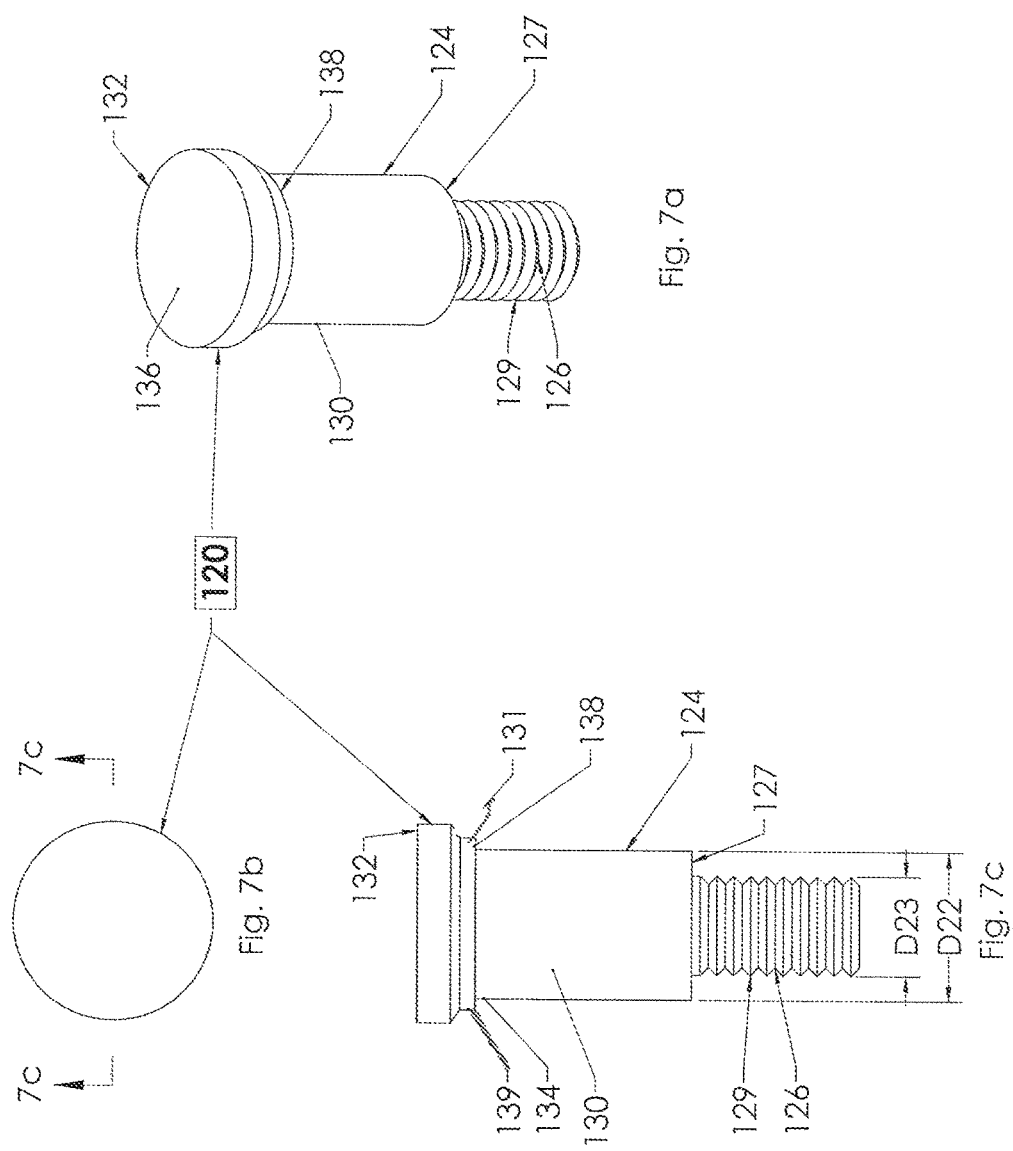

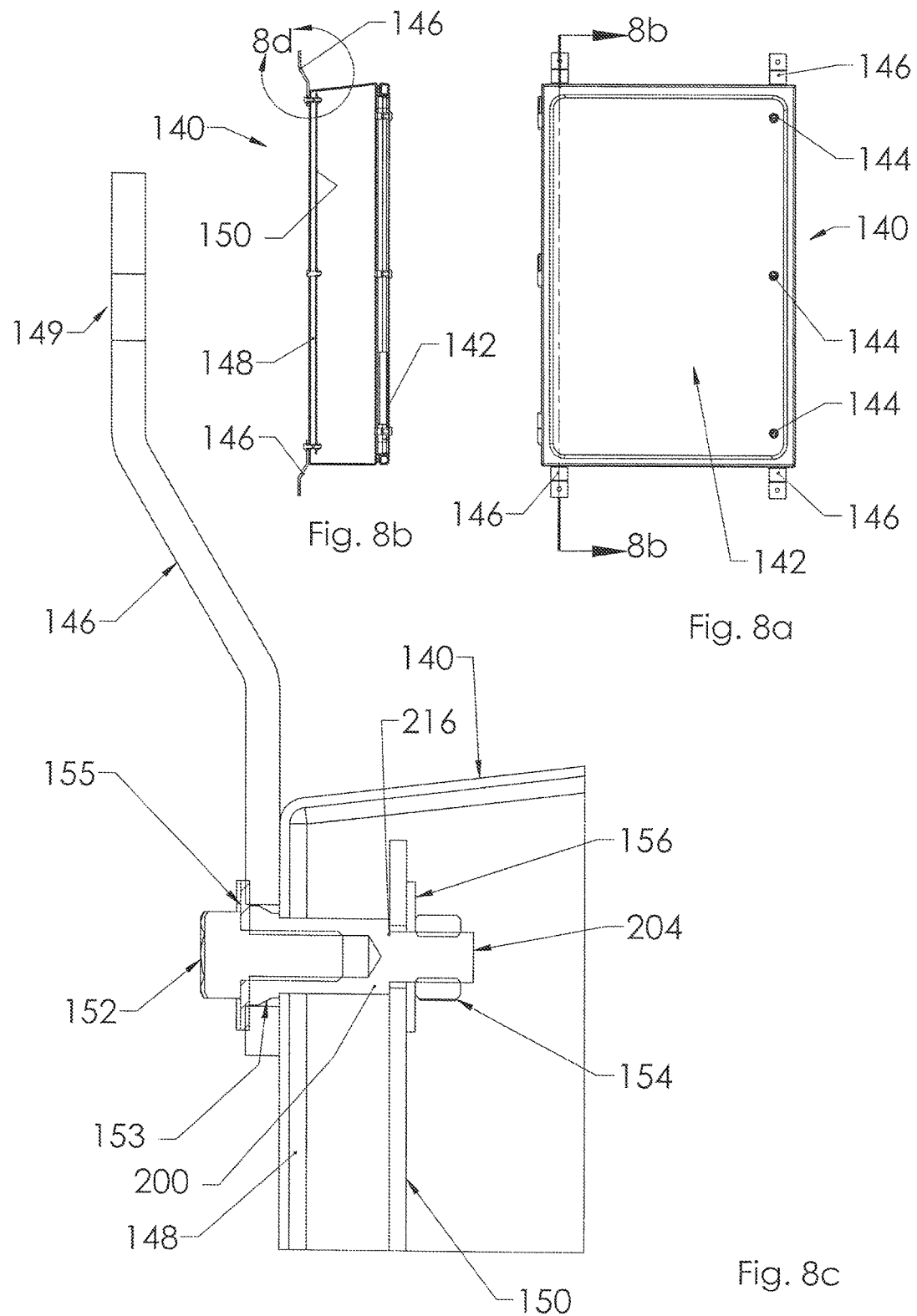

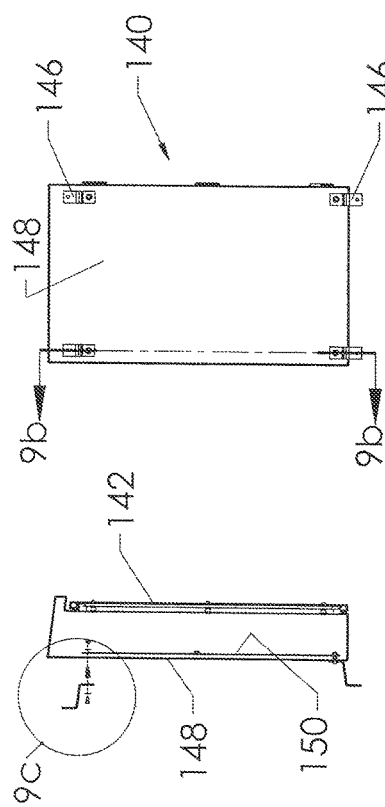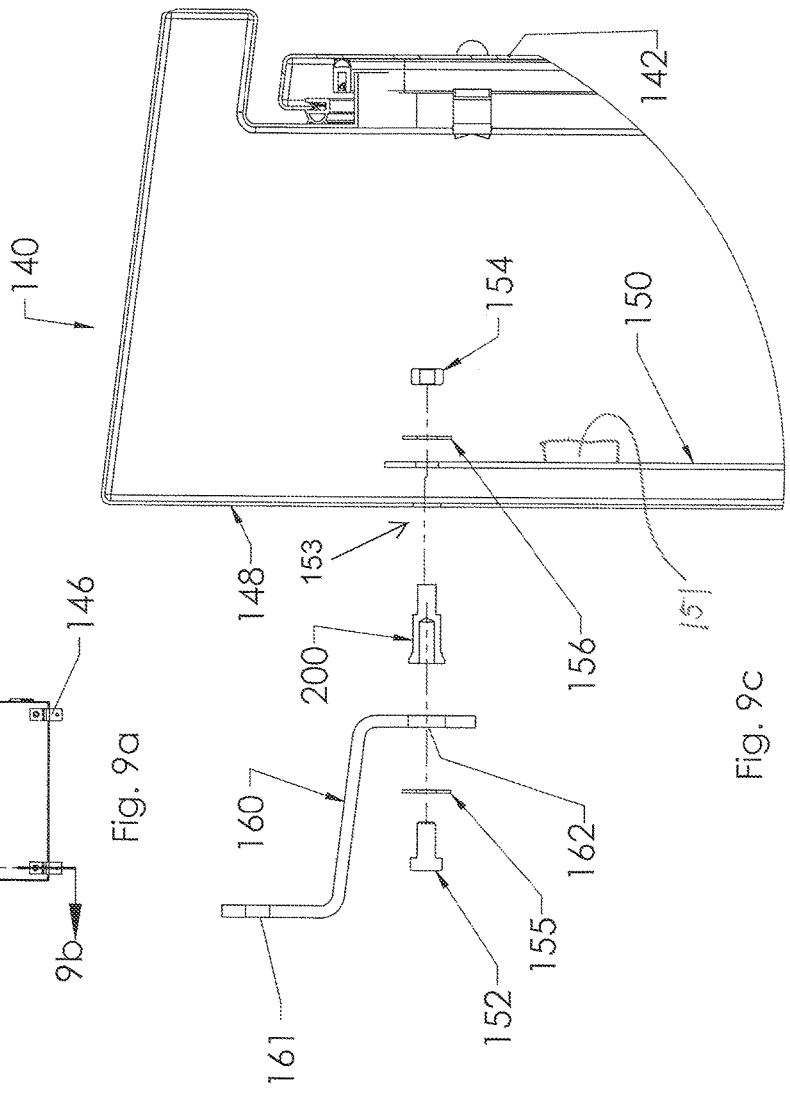

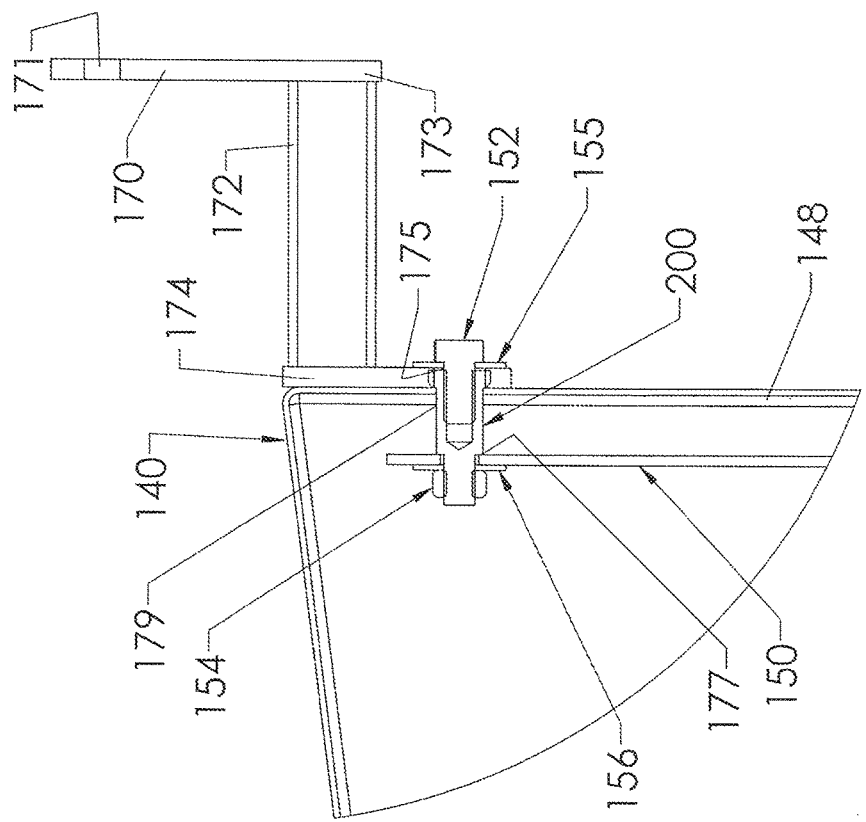
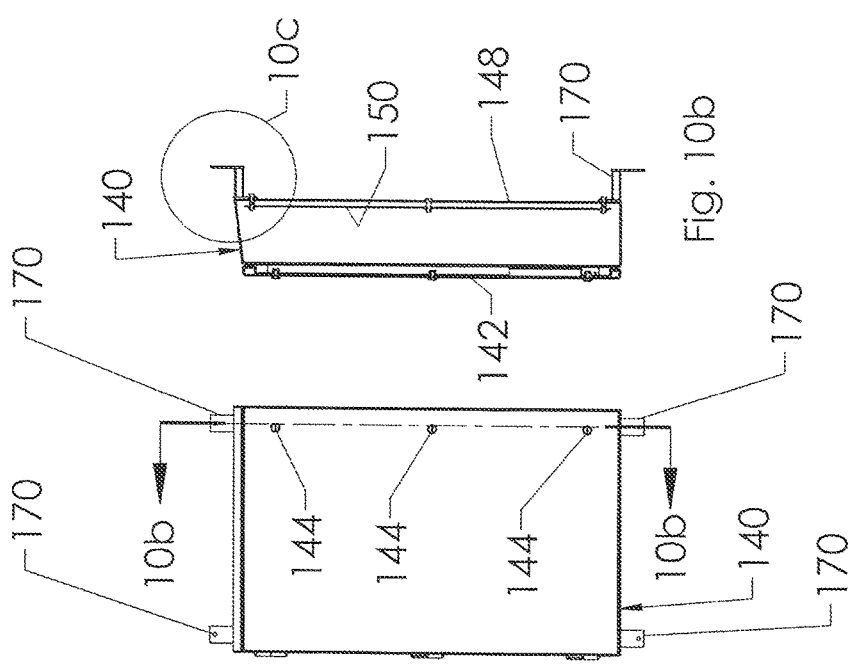

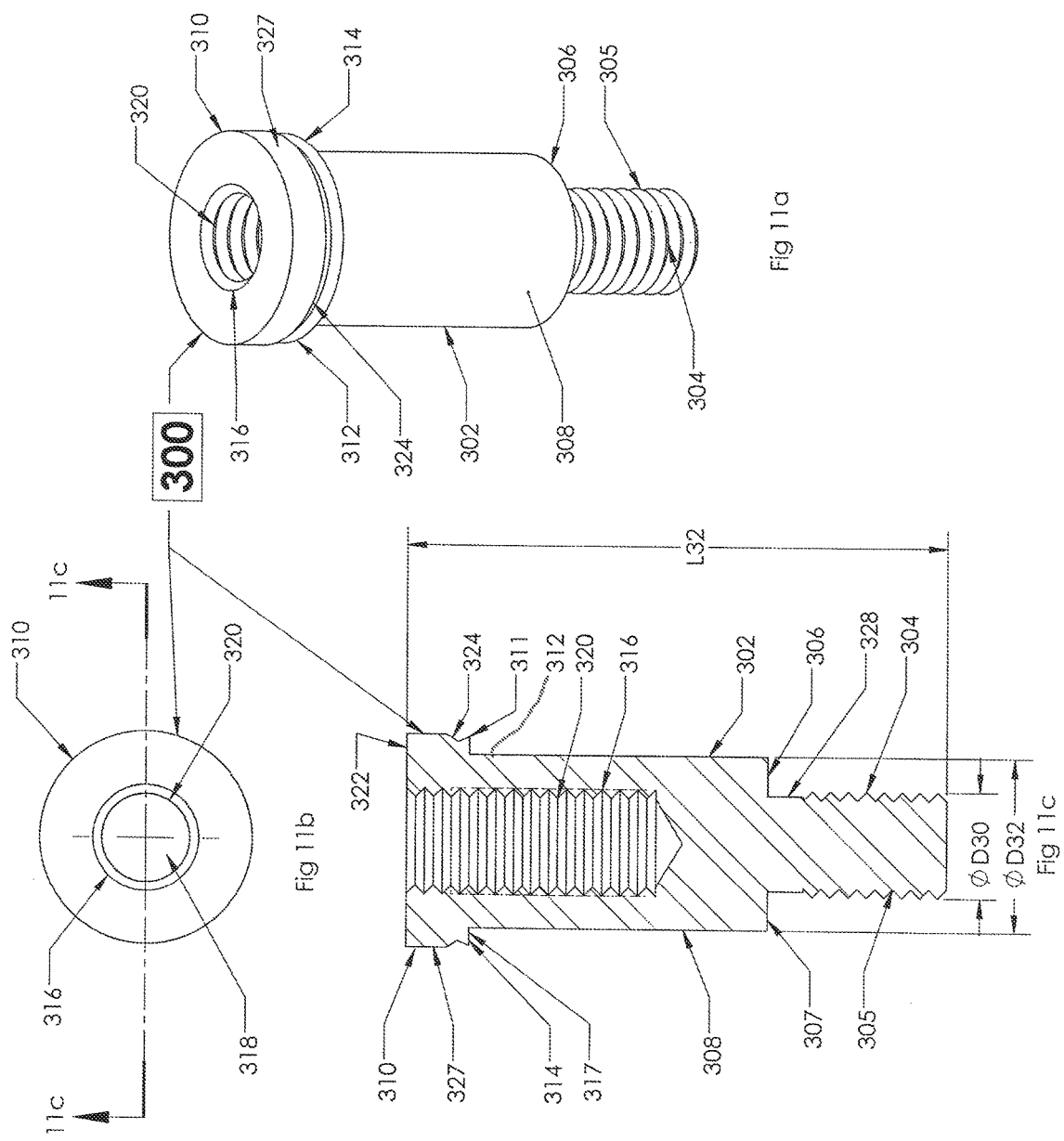

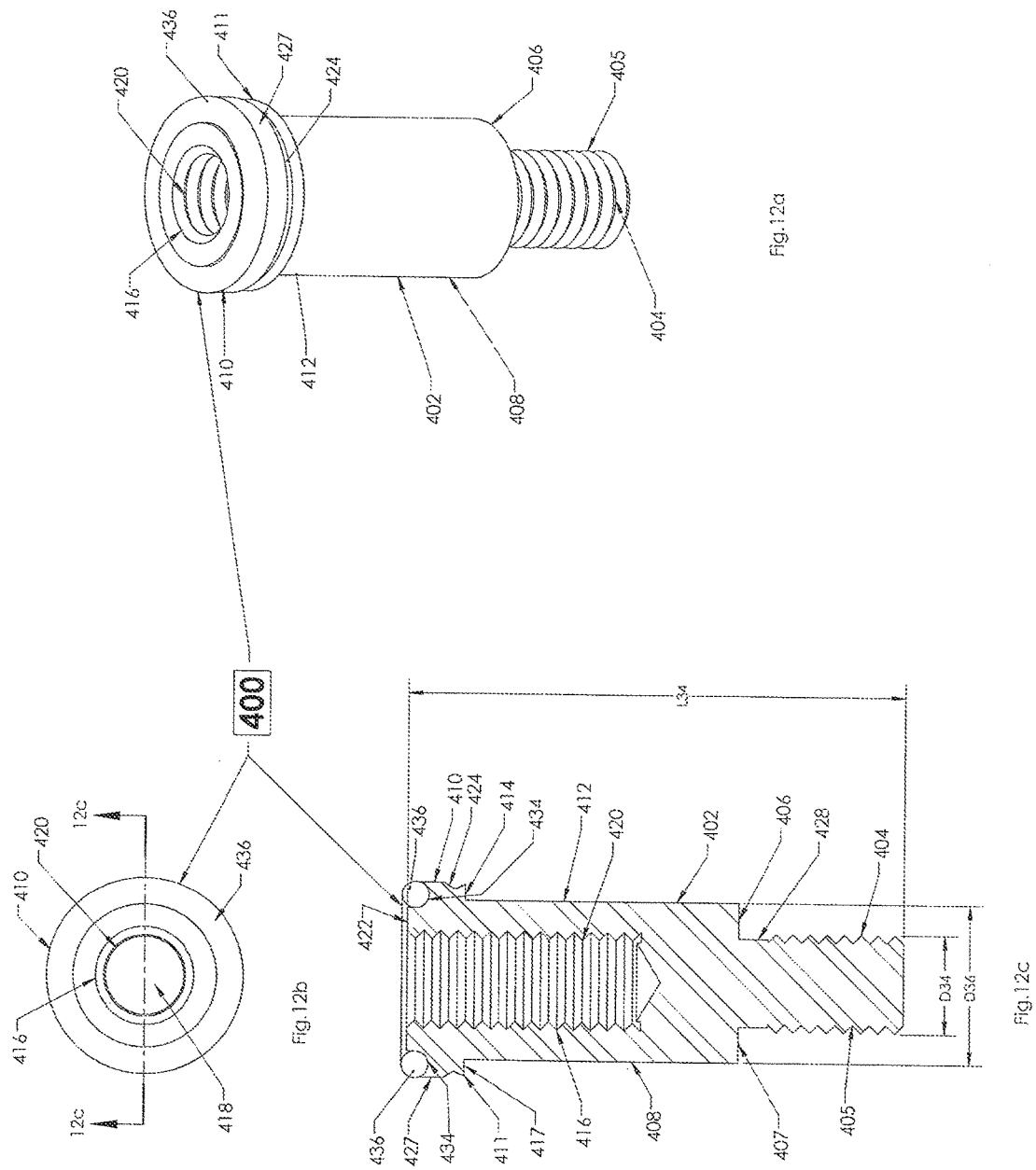

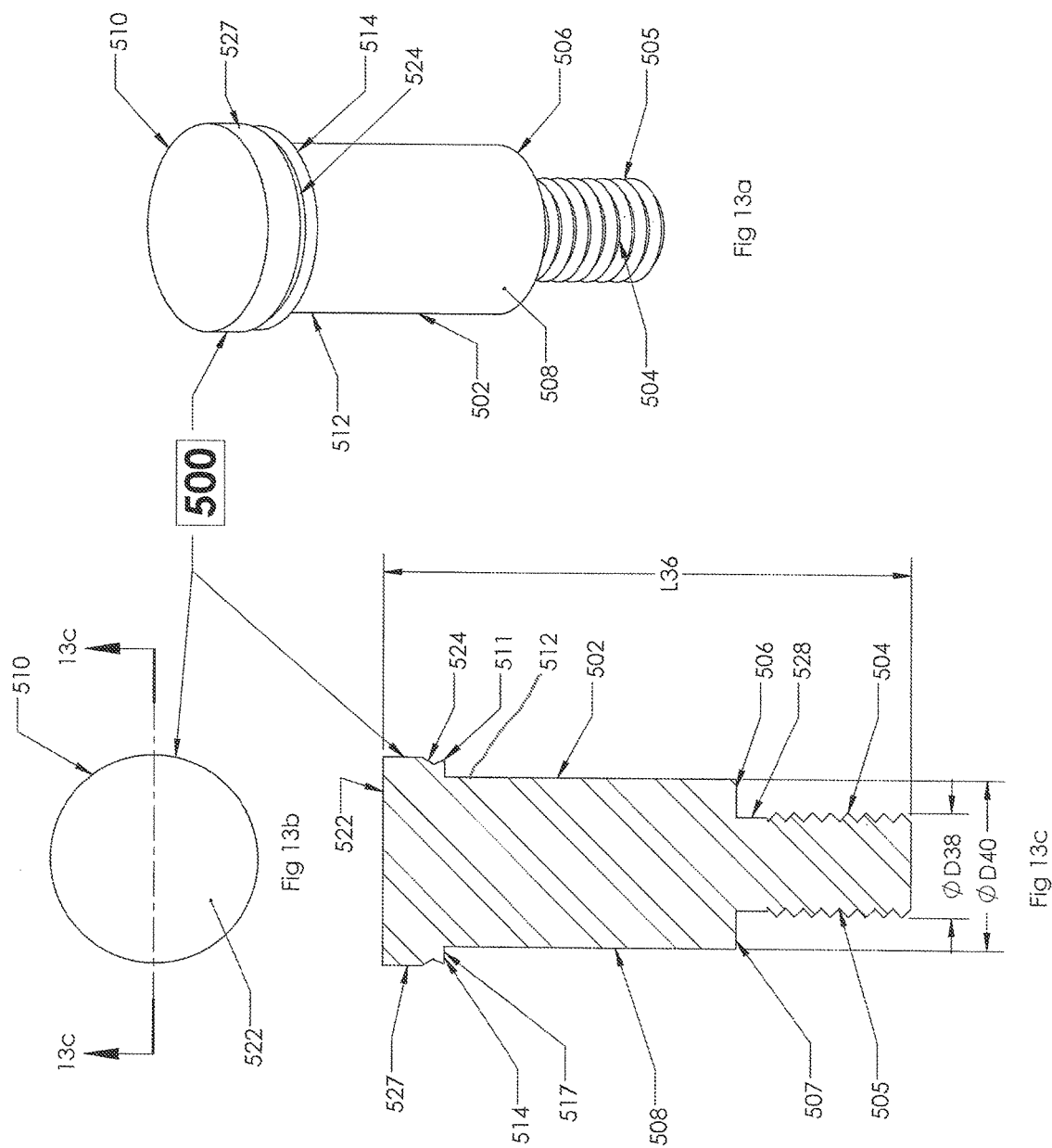

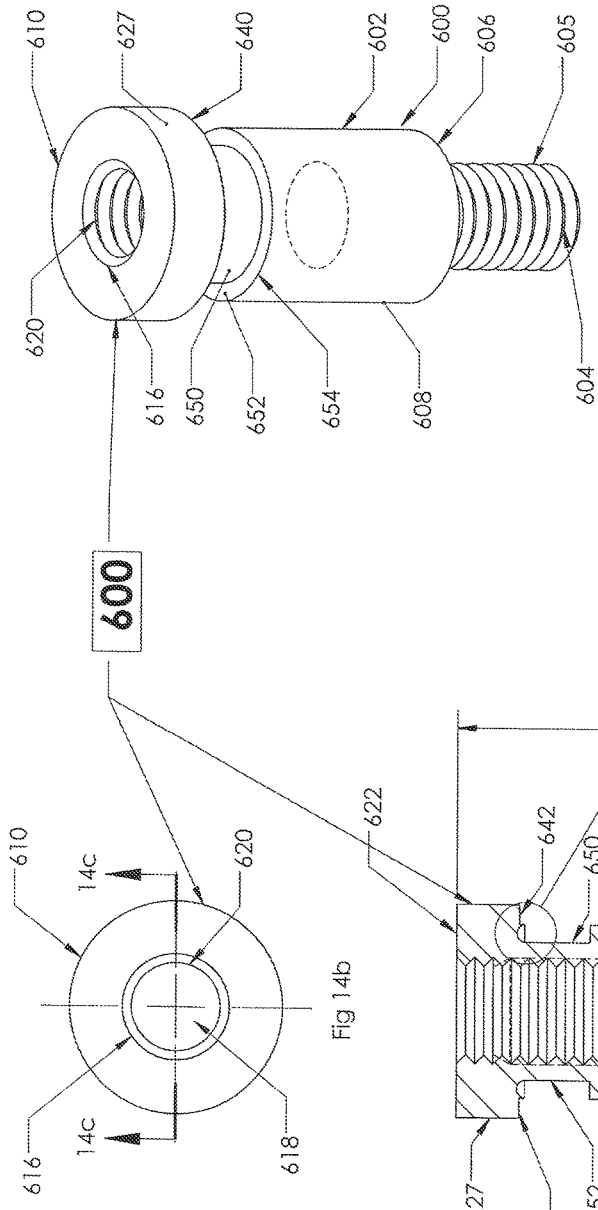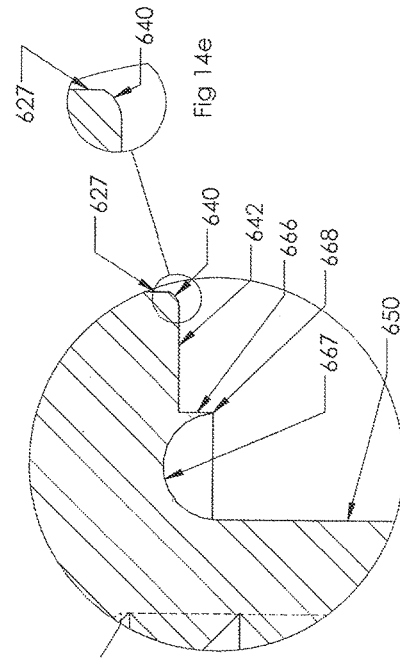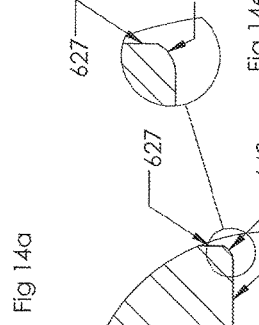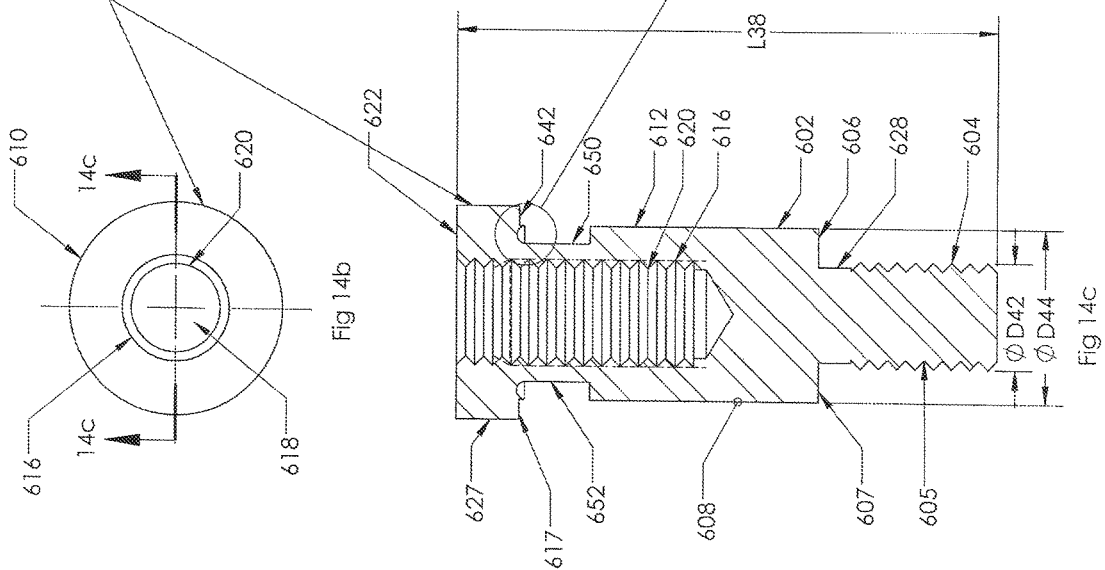

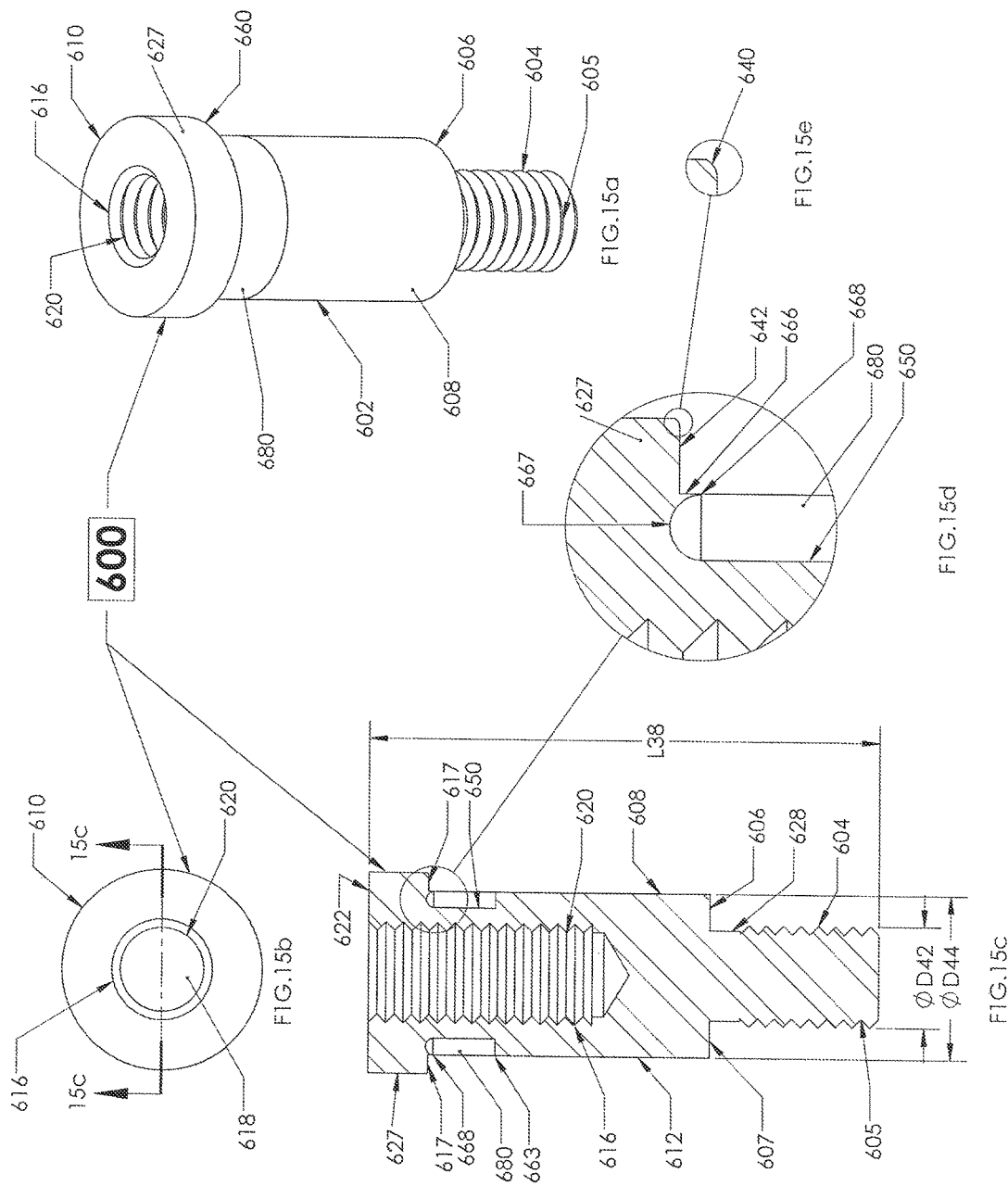

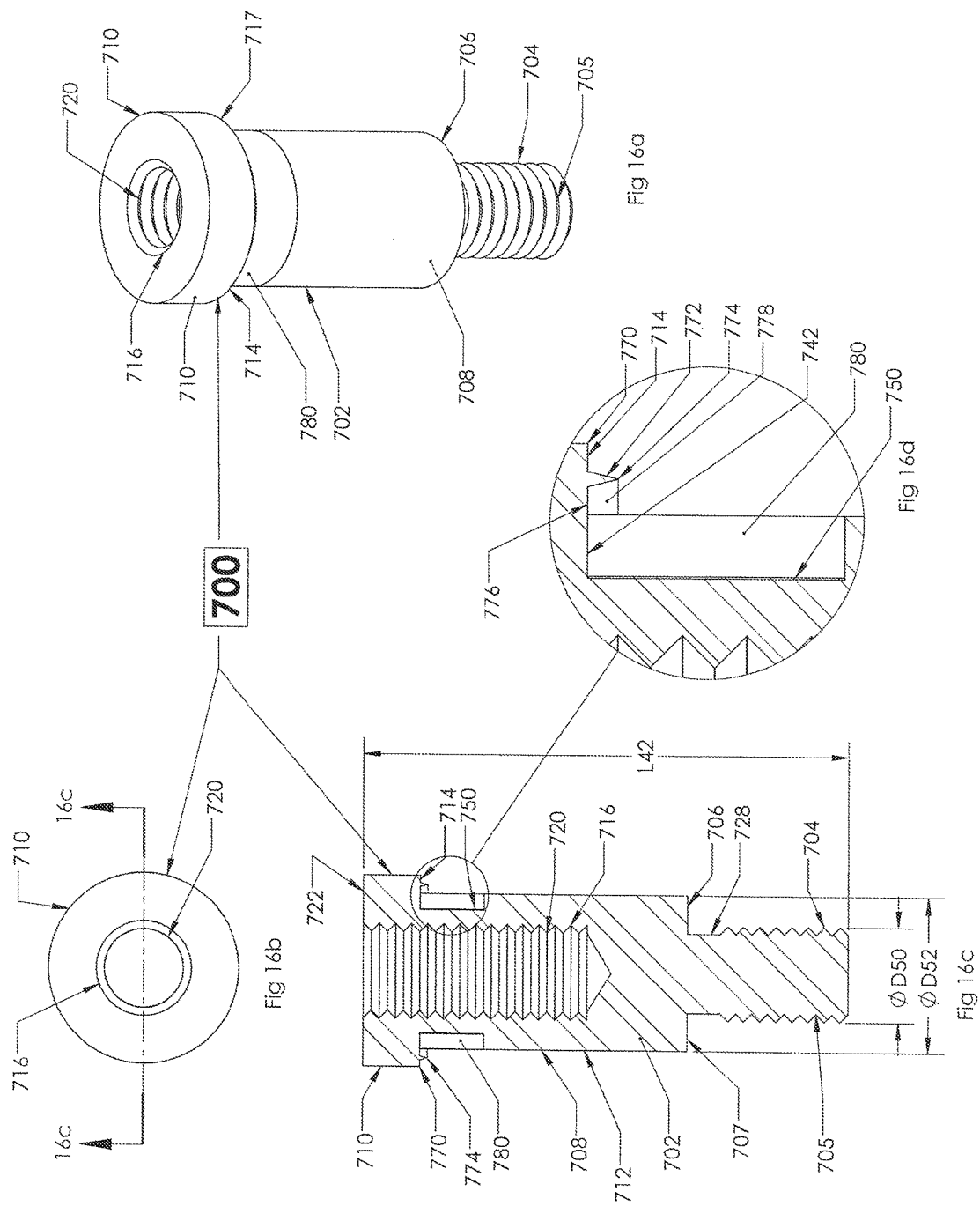

APPARATUS FOR MOUNTING ENCLOSURES AND FIXTURES AND ELECTRONICS CONTAINED THEREIN

CROSS-REFERENCE TO RELATED APPLICATIONS

This patent application is a Continuation-in-Part (CIP) of patent application having Ser. No. 14/489,413, filed Sep. 17, 2014, which claims priority to provisional patent application entitled "Double Stud" filed on Sep. 17, 2013, having Ser. No. 61/878,629. Both of these previously filed applications referenced immediately above in this paragraph are hereby incorporated by reference.

BACKGROUND OF THE INVENTION

Field of the Invention

The present invention relates generally to mounting fixtures, and more particularly, to an apparatus for mounting watertight enclosures containing electronics.

Description of Related Art

Current UL50 and UL508A standards require electrical enclosures to be supplied with mounting hardware that is used to mount the enclosure sub panel to the back of the enclosure wall. This is typically accomplished using a weld on panel studs. UL50 and UL508A standards also require that enclosure manufactures supply means for mounting an enclosure by an electrician using basic tools. The cheapest way for a manufacturer to meet the UL50 and UL508A standards is to include holes in the back of the enclosure and a bag of nuts, bolts and gaskets, in hopes that the electrician installs the gaskets correctly and water does not leak into the enclosure during the life of the enclosure installation which could last over 30 years.

One of the problems with just providing mounting holes in the back of the enclosure is that the electrical sub panel may be required to be removed prior to mounting the enclosure which can require hours of extra electrical labor if the electrician has to unwire pushbuttons and/or other electrical devices that may be mounted on the enclosure door, and then re-wire and test the devices after the enclosure is mounted and the sub panel reinstalled. If the electrician installing the enclosure is in a high risk wash-down area, a welding contractor is often hired to weld the mounting holes closed, and then weld on a bracket that the electrician can use to properly install the enclosure without removing the back panel in the enclosure.

Accordingly, there is a need for a more efficient and reliable apparatus for mounting watertight enclosures and the electronics contained inside.

ASPECTS AND SUMMARY OF THE PRESENT INVENTION

One aspect of the present invention is to provide a more time efficient and adaptable apparatus for mounting watertight enclosures and electronics contained therein.

Another aspect of the present invention is to provide a mounting apparatus that does not require the electronics to be removed or remounted during the enclosure mounting process.

A further aspect of the present invention is to provide a mounting apparatus that facilitates mounting an enclosure to a wall.

An additional aspect of the present invention is to provide a mounting apparatus that more reliably maintains a watertight seal of a watertight enclosure.

In order to achieve these aspects and others, the present invention provides a dual purpose fastener or stud that is installed and welded or otherwise secured onto the back of an enclosure, which still enables an electrician to mount a sub panel from inside of the enclosure, while mounting the enclosure itself from the outside, and further, without removing the enclosure sub panel. The present invention further eliminates the need for electricians to install gaskets to seal mounting holes because the fastener is welded in place, eliminating the requirements of special enclosure mounting gaskets and hardware. Additional mounting hardware can be included to mount the enclosure as close as one inch or less off the back of a wall or adjoining surface to as much as four inches or more of overall clearance, which is required for enclosure installations in food plants.

The fastener, stud, or apparatus of the present invention meets the requirements for UL50 and UL508A and associations of Underwriters Laboratories, Inc. ("UL"), Canadian Standards Association ("CSA"), and Association of Standardization and Certification ("ANCE"). The apparatus of the present invention, sometimes referred to by the inventor as a the Double Stud™ fastener, can be used on all types of electrical UL50 enclosures, including enclosures for indoor locations (Types: 1, 2, 5, 12K and 13) or (NEMA: 1, 2, 5, 12K and 13), and enclosures for indoor and outdoor locations (Types 3, 3R, 3S, 4 4X, 6 and 6P) or (NEMA: 3, 3R, 3S, 4, 4X, 6 and 6P).

Accordingly, the present invention provides a stud or fastener for mounting an enclosure having a body with a first diameter, a length, a top, and a bottom. A head is connected to the top of the cylindrical body and extends beyond an outer surface of the cylindrical body. A cylindrical extension is connected to the bottom of the cylindrical body having a second diameter less than the first diameter, and an outer surface of the cylindrical extension is threaded. The cylindrical body includes a threaded cylindrical bore having an opening in the top of the cylindrical body, and the threaded cylindrical bore extends into the cylindrical body.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

BRIEF DESCRIPTION OF THE DRAWINGS

FIG. 1a is a perspective view of a mounting apparatus configured in accordance with a preferred embodiment of the present invention;

FIG. 1b is a top view of the mounting apparatus shown in FIG. 1a;

FIG. 1c is a cross-sectional view of the mounting apparatus shown in and taken along line 1c-1c of FIG. 1b;

FIG. 2a is a perspective view of a mounting apparatus configured in accordance with another embodiment of the present invention;

FIG. 2b is a top view of the mounting apparatus shown in FIG. 2a;

FIG. 2c is a cross-sectional view of the mounting apparatus shown in and taken along line 2c-2c of FIG. 2b;

FIG. 3a is a perspective view of a mounting apparatus configured in accordance with a further embodiment of the present invention;

FIG. 3b is a top view of the mounting apparatus shown in FIG. 3a;

FIG. 3c is a cross-sectional view of the mounting apparatus shown in and taken along line 3c-3c of FIG. 3b;

FIG. 4a is a perspective view of a mounting apparatus configured in accordance with another embodiment of the present invention;

FIG. 4b is a top view of the mounting apparatus shown in FIG. 4a;

FIG. 4c is a cross-sectional view the mounting apparatus shown in and taken along line 4c-4c of FIG. 4;

FIG. 5a is a perspective view of a mounting apparatus configured in accordance with a further embodiment of the present invention;

FIG. 5b is a top view of the mounting apparatus shown in FIG. 5a;

FIG. 5c is a cross-sectional view of the mounting apparatus shown in and taken alone line 5c-5c of FIG. 5b;

FIG. 6a is a perspective view of a mounting apparatus configured in accordance with a further embodiment of the present invention;

FIG. 6b is a top view of the mounting apparatus shown in FIG. 6a;

FIG. 6c is a cross-sectional view of the mounting apparatus shown in and taken alone line 6c-6c of FIG. 6b;

FIG. 6d is a side view of the mounting apparatus shown in FIG. 6a;

FIG. 7a is a perspective view of a mounting apparatus configured in accordance with a further embodiment of the present invention;

FIG. 7b is a top view of the mounting apparatus shown in FIG. 7a;

FIG. 7c is a cross-sectional view of the mounting apparatus shown in and taken alone line 7c-7c of FIG. 7b;

FIG. 8a is a front view of a watertight enclosure utilizing a mounting apparatus of the present invention;

FIG. 8b is a cross-sectional view of the enclosure shown in and taken along line 8b-8b of FIG. 8a;

FIG. 8c is an enlarged view of the circled portion "8c" shown in FIG. 8b;

FIG. 9a is a rear view of an enclosure mountable in accordance with the present invention;

FIG. 9b is a cross-sectional of the enclosure shown in and taken along line 9b-9b of FIG. 9a;

FIG. 9c is an enlarged view of the circled portion "9c" shown in FIG. 9b;

FIG. 10a is a front view of an enclosure mountable in accordance with the present invention;

FIG. 10b is a cross-sectional of the enclosure shown in and taken along line 10b-10b of FIG. 10a;

FIG. 10c is an enlarged view of the circled portion "10c" shown in FIG. 10b;

FIG. 11a is a perspective view of a mounting apparatus configured in accordance with a further embodiment of the present invention;

FIG. 11b is a top view of the mounting apparatus shown in FIG. 11a;

FIG. 11c is a cross-sectional view of the mounting apparatus shown in and taken along line 11c-11c of FIG. 11b;

FIG. 12a is a perspective view of a mounting apparatus configured in accordance with a further embodiment of the present invention;

FIG. 12b is a top view of the mounting apparatus shown in FIG. 12a;

FIG. 12c is a cross-sectional view of the mounting apparatus shown in and taken along line 12c-12c of FIG. 12b;

FIG. 13a is a perspective view of a mounting apparatus configured in accordance with a further embodiment of the present invention;

FIG. 13b is a top view of the mounting apparatus shown in FIG. 13a;

FIG. 13c is a cross-sectional view of the mounting apparatus shown in and taken along line 13c-13c of FIG. 13b;

FIG. 14a is a perspective view of a mounting apparatus configured in accordance with a further embodiment of the present invention;

FIG. 14b is a top view of the mounting apparatus shown in FIG. 14a;

FIG. 14c is a cross-sectional view of the mounting apparatus shown in and taken along line 14c-14c of FIG. 14b;

FIG. 14d is an enlarged view of the circled portion shown in FIG. 14c;

FIG. 14e is an enlarged view of the circle portion shown in FIG. 14d;

FIG. 15a is a perspective view of a mounting apparatus configured in accordance with a further embodiment of the present invention;

FIG. 15b is a top view of the mounting apparatus shown in FIG. 15a;

FIG. 15c is a cross-sectional view of the mounting apparatus shown in and taken along line 15c-15c of FIG. 15b;

FIG. 15d is an enlarged view of the circled portion shown in FIG. 15c;

FIG. 15e is an enlarged view of the circle portion shown in FIG. 15d;

FIG. 16a is a perspective view of a mounting apparatus configured in accordance with a further embodiment of the present invention;

FIG. 16b is a top view of the mounting apparatus shown in FIG. 16a;

FIG. 16c is a cross-sectional view of the mounting apparatus shown in and taken along line 16c-16c of FIG. 16b; and FIG. 16d is an enlarged view of the circled portion shown in FIG. 16d.

DETAILED DESCRIPTION OF THE PREFERRED EMBODIMENTS

Referring now to the drawings, FIG. 1a is a perspective view of a fastener, stud, or mounting apparatus 200 configured in accordance with a preferred embodiment of the present invention. FIG. 1b is a top view of the apparatus 200, and FIG. 1c is a cross-sectional view of the apparatus 200 shown in and taken along line 1c-1c of FIG. 1b. The apparatus 200 includes a cylindrical body 202 having a diameter D20 and a length L20. The diameter D20 and the length L20 are not any particular value, but D20 typically is around half an inch, and the length L20 typically is around two inches. The body 202 preferably is cylindrical in configuration, but can be other shapes, such as rectangular.

An extension 204 is connected to a bottom 206 of the cylindrical body 202. The extension 204 preferably has a cylindrical configuration and is screw threaded on an outer surface 205 of the extension 204. The extension 204 has a diameter D21 which is less than the diameter D20 of the cylindrical body 202, thus exposing a portion of the bottom 206 to form a ridge or edge 207. The outer surface 208 of the cylindrical body 202 preferably is smooth.

A head or rim 210 is formed on top 212 of the cylindrical body 202. The top 222 and bottom 211 of the head 210 preferably are flat and extend beyond the outer surface 208 of the cylindrical body 202 to form a ridge, edge, or ledge 214. A bore 216 having an opening 218 in the head 210 extends into the cylindrical body 202. The internal surface or wall 220 of the bore 216 preferably is threaded to receive a bolt. The head 210 can be any shape, such as circular or square. In FIG. 1b the head 210 has a circular shape.

A ramp or tapered section 224 can be included to function as a transition from the width of the rim or head 210 to the width or diameter D20 of the cylindrical body 202. A smaller rim 226 can be located at the bottom 211 of the head 210. The apparatus 200 preferably is constructed as one unitary piece and made of a metal, such as stainless steel.

A groove or weld relief located at tapered section 224 is included in the outer surface 226 of the head 210 of the apparatus 200 and extends around the entire circumference of the outer surface 224 of the head 210. A protrusion, projection, extension or weld point 211 is located at the intersection of the outer surface 226 and the bottom 214 of the head 210. The weld point 211 provides a pointed projection for a combination of Tungsten Inert Gas (TIG) weld or a Gas Tungsten Arc Weld (GTAW) and fillet weld. The weld point 211 is located to provide an easily accessible location for a TIG weld, that when welded, provides an excelling hermetic and strong seal between the apparatus 200 and the surface to which the bottom 214 of the head 210 is welded. The apparatus 200 preferably is constructed as one unitary piece and made of a metal, such as stainless steel.

FIG. 2a is a perspective view of a fastener, stud, or mounting apparatus 10 configured in accordance with another embodiment of the present invention. FIG. 2b is a top view of the mounting apparatus 10, and FIG. 2c is a cross-sectional view of apparatus 10 taken along line 2c-2c of FIG. 2b. The apparatus 10 includes a body 12 having a first diameter D1 and a length L1. The first diameter D1 and the length L1 are not any particular value, but first diameter D1 typically is around half an inch, and the length L1 typically is around two inches. The body 12 preferably is cylindrical in configuration, but can be other shapes, such as rectangular.

An extension 14 is connected to a bottom 13 of the cylindrical body 12. The extension 14 preferably has a cylindrical configuration and is screw threaded on an outer surface 17 of the extension 14. The extension 14 has a diameter D2 which is less than the diameter D1 of the body 12, thus exposing a portion of the bottom 13 to form a ridge or edge 11. The outer surface 19 of the cylindrical body 12 preferably is smooth.

A head or rim 16 is formed on top 23 of the cylindrical body 12. The top 25 and bottom 21 of the head 16 preferably are flat and extend beyond the outer surface 19 of the cylindrical body 12 to form a ridge, edge, or ledge 15 and 18. A bore 20 having an opening 22 in the head 16 extends into the cylindrical body 12. The internal surface or wall 24 of the bore 20 preferably is threaded to receive a bolt. The head 16 can be any shape, such as circular or square. In FIG. 2c, the head 16 has an octagon shape.

A ramp or tapered section 26 can be included to function as a transition from the width of the rim 16 to the width or diameter D1 of the cylindrical body 12. The apparatus 10 preferably is constructed as one unitary piece and made of a metal, such as stainless steel.

A groove or weld relief located at tapered section 26 between the outer surface of the head 16 of the cylindrical body 12 and extends around the entire circumference of the outer surface 26 of the head 16. A protrusion, projection, extension or weld point 15 is located at the intersection of the outer surface 26 and the bottom 21 of the head 16. The weld point 15 provides a pointed projection for a combination of Tungsten Inert Gas (TIG) weld or a Gas Tungsten Arc Weld (GTAW) and fillet weld. The weld point 15 is located to provide an easily accessible location for a TIG weld, that when welded, provides an excelling hermetic and strong seal between the apparatus 10 and the surface to which the bottom 21 of the head 16 is welded. The apparatus 10 preferably is constructed as one unitary piece and made of a metal, such as stainless steel.

FIG. 3a is a perspective view of a mounting apparatus 30 configured in accordance with a further embodiment of the present invention. The apparatus 30 is similar to apparatus 200, except the head or rim 36 of the apparatus 30 has a square configuration instead of a round configuration like apparatus 200. FIG. 3b is a top view of the apparatus 30, and FIG. 2c is a cross-sectional view of the apparatus 30 shown in and taken along line 3c-3c of FIG. 3b. The apparatus 30 includes a cylindrical body 32 having a diameter D3 and a L2. The diameter D3 and the length L2 are not any particular value, but D3 typically is around half and inch, and the length L2 typically is around one inch. The body 32 preferably is cylindrical in configuration, but can be other shapes, such as rectangular.

An extension 34 is connected to a bottom 33 of the cylindrical body 32. The extension 34 preferably has a cylindrical configuration and is screw threaded on an outer surface 35 of the extension 34. The extension 34 has a diameter D4 which is less than the diameter D3 of the cylindrical body 32, thus exposing a portion of the bottom 33 to form a ridge or edge 31. The outer surface 37 of the cylindrical body 32 preferably is smooth.

A head or rim 36 is formed on top 39 of the cylindrical body 32. The top 43 and bottom 41 of the head 36 preferably are flat and extend beyond the outer surface 37 of the cylindrical body 32 to form a ridge, edge, or ledge 47. A bore 40 has an opening 42 in the head 36 extending into the cylindrical body 32. The internal surface or wall 44 of the bore 40 preferably is threaded to receive a bolt. The head 36 can be any shape, such as circular or square. In FIG. 3c, the head 36 has a square shape.

A ramp or tapered section 46 can be included to function as a transition from the width of the rim 36 to the width or diameter D3 of the cylindrical body 32. The apparatus 30 preferably is constructed as one unitary piece and made of a metal, such as stainless steel.

A groove or weld relief located at the tapered section 46 on the outer surface of the head 36 of the apparatus 30 and extends around the entire circumference of the outer surface of the taper section 46 of the head 36. A protrusion, projection, extension or weld point 47 is located at the intersection of the outer surface of the tapered section 46 and the bottom 39 of the head 36. The weld point 47 provides a pointed projection for a combination of Tungsten Inert Gas (TIG) weld or a Gas Tungsten Arc Weld (GTAW) and fillet weld. The weld point 47 is located to provide an easily accessible location for a TIG weld, that when welded, provides an excelling hermetic and strong seal between the apparatus 30 and the surface to which the bottom 39 of the head 36 is welded. The apparatus 30 preferably is constructed as one unitary piece and made of a metal, such as stainless steel.

FIG. 4a is a perspective view of a mounting apparatus 50 configured in accordance with a further embodiment of the present invention. The apparatus 50 is similar to apparatus 200, except the head or rim 56 of the apparatus 50 has a hexagon configuration instead of a circular configuration like apparatus 200. FIG. 4b is a top view of the apparatus 50, and FIG. 4c is a cross-sectional view of the apparatus 50 shown in and taken along line 4c-4c of FIG. 4b. The apparatus 50 includes a cylindrical body 52 having a diameter D5 and a L3. The diameter D5 and the length L3 are not any particular value, but D5 typically is around half and inch, and the length L3 typically is around one inch. The body 52 preferably is cylindrical in configuration, but can be other shapes, such as rectangular.

An extension 54 is connected to a bottom 53 of the cylindrical body 52. The extension 54 preferably has a cylindrical configuration and is screw threaded on an outer surface 55 of the extension 54. The entire outer surface 55 of the extension 54 is not threaded, such as location 68. The extension 54 has a diameter D6 which is less than the diameter D5 of the cylindrical body 52, thus exposing a portion of the bottom 51 of the cylindrical body 52 to form a ridge or edge 61. The surface 57 of the cylindrical body 52 preferably is smooth.

A head or rim 56 is formed on top 59 of the cylindrical body 52. The top 66 and bottom 65 of the head 56 preferably are flat and extend beyond the outer surface 57 of the cylindrical body 52 to form a ridge, edge, or ledge 67. A bore 60 having an opening 62 in the head 56 extends into the cylindrical body 52. The internal surface or wall 64 of the bore 60 preferably is threaded to receive a bolt. The head 56 can be any shape, such as circular or square. In FIG. 4b, the head 56 has a hexagon shape.

A ramp or tapered section 63 can be included to function as a transition from the width of the rim 56 to the width or diameter D3 of the cylindrical body 52. The apparatus 50 preferably is constructed as one unitary piece and made of a metal, such as stainless steel.

A groove or weld relief located on tapered section 63 between the outer surface of the head 56 of the apparatus 50 and extends around the entire circumference of the outer surface of the tapered section 63 of the head 56. A protrusion, projection, extension or weld point 59 is located at the intersection of the tapered section 63 of the head 56 and the bottom 67 of the head 56. The weld point 59 provides a pointed projection for a combination of Tungsten Inert Gas (TIG) weld or a Gas Tungsten Arc Weld (GTAW) and fillet weld. The weld point 59 is located to provide an easily accessible location for a TIG weld, that when welded, provides an excelling hermetic and strong seal between the apparatus 50 and the surface to which the bottom 67 of the head 56 is welded. The apparatus 50 preferably is constructed as one unitary piece and made of a metal, such as stainless steel.

FIG. 5a is a perspective view of a mounting apparatus 70 configured in accordance with another embodiment of the present invention. The apparatus 70 is similar to apparatus 200, except the head or rim 76 of the apparatus 70 has a geared or toothed configuration, instead of a circle configuration like apparatus 200. FIG. 5b is a top view of the apparatus 70, and FIG. 5c is a cross-sectional view of the apparatus 70 shown in and taken along line 5c-5c of FIG. 5b. The apparatus 70 includes a cylindrical body 72 having a diameter D7 and a length L4. The diameter D7 and the length L4 are not any particular value, but D7 typically is around half an inch, and the length L4 typically is around two inches. The body 72 preferably is cylindrical in configuration, but can be other shapes, such as rectangular.

An extension 74 is connected to a bottom 73 of the cylindrical body 72. The extension 74 preferably has a cylindrical configuration and is screw threaded on an outer surface 75 of the extension 74. The extension 74 has a diameter D8 which is less than the diameter D7 of the cylindrical body 72, thus exposing a portion of the bottom 73 of the cylindrical body 72 to form a ridge or edge 81. The outer surface 77 of the cylindrical body 72 preferably is smooth.

A head or rim 76 is formed on top 79 of the cylindrical body 72. The top 86 and the bottom 85 of the head 76 preferably are flat and extend beyond the outer surface 77 of the cylindrical body 72 to form a ridge, edge, or ledge 71. A bore 80 having an opening 82 in the head 76 extends into the cylindrical body 72. The internal surface or wall 84 of the bore 80 preferably is threaded to receive a bolt. The head 76 can be any shape, such as circular or square. In FIG. 5b, the head 76 has a gear or toothed shape.

A ramp or tapered section 83 can be included to function as a transition from the width of the rim 76 to the width or diameter D7 of the cylindrical body 72. The apparatus 70 preferably is constructed as one unitary piece and made of a metal, such as stainless steel.

FIG. 6a is a perspective view of a mounting apparatus 90 configured in accordance with another embodiment of the present invention. FIG. 6b is a top view of the apparatus 90, and FIG. 6c is a cross-sectional view of the apparatus 90 shown in and taken along line 6c-6c of FIG. 6b. The apparatus 90 includes a partially cylindrical body 92 having a diameter D9. The body 92 preferably is at least partially cylindrical in configuration. Flat portions 95 on the outer surface 104 of the body 92 provide locations for a wrench to grip and tighten or loosen the mounting apparatus 90. FIG. 6d is a side view of the apparatus 90 illustrating the flat portions 95 of the surface 104 of the body 92.

An extension 94 is connected to a bottom 93 of the cylindrical body 92. The extension 94 preferably has a cylindrical configuration and is screw threaded on an outer surface 97 of the extension 94. The extension 94 has a diameter D10 which is less than the diameter D9 of the cylindrical body 92, thus exposing a portion of the bottom 93 to form a ridge or edge 91.

A head or rim 96 is formed on top 99 of the cylindrical body 92. The top 102 and bottom 105 of the head 96 preferably are flat and extend beyond the outer surface 104 of the cylindrical body 92 to form a ridge, edge, or ledge. A bore 100 having an opening 110 in the head 96 extends into the cylindrical body 92. The internal surface or wall 101 of the bore 100 preferably is threaded to receive a bolt. The head 96 can be any shape, such as circular or square. In FIG. 6b, the head 96 has a circular shape. The apparatus 90 preferably is constructed as one unitary piece and made of a metal, such as stainless steel.

The outer surface 104 of the cylindrical body 92, unlike apparatus 200, is screw threaded. The threading on the outer surface 104 of the cylindrical body 92 enables a nut 98 to be screwed onto the outer surface 104 of the cylindrical body 92 and tightened up against the flat bottom surface 105 or a washer 108 against the head 96. This design enables the apparatus 90 to be manually secured within a mounting hole sized for the cylindrical body 92. The washer 98 preferably is constructed of rubber or metal, and can be flat or have a circular cross-section as illustrated in FIG. 6c.

FIG. 7a is a perspective view of a mounting apparatus 120 configured in accordance with a further embodiment of the present invention. The apparatus 120 is similar to apparatus 200, except the head or rim 132 does not have bore 216. FIG. 7b is a top view of the apparatus 120, and FIG. 7c is a cross-sectional view of the apparatus 120 shown in and taken along line 7c-7c of FIG. 7b. The apparatus 120 includes a cylindrical body 124 having a diameter D22.

An extension 126 is connected to a bottom 127 of the cylindrical body 124. The extension 126 preferably has a cylindrical configuration and is screw threaded on an outer surface 129 of the extension 126. The extension 126 has a diameter D23 which is less than the diameter D22 of the cylindrical body 124, thus exposing a portion of the bottom 127 of the cylindrical body 127 to form a ridge or edge. The surface 130 of the cylindrical body 124 preferably is smooth.

A head or rim 132 is formed on a top 134 of the cylindrical body 124. The top 136 and bottom 138 of the head 132 preferably are flat and extend beyond the outer surface 130 of the cylindrical body 124 to form a ridge, edge, or ledge. The head 132 can be any shape, such as circular or square. In FIG. 7b, the head 132 has a circular shape.

A ramp or tapered section 131 can be included to function as a transition from the width of the head or rim 132 to the width or diameter D22 of the cylindrical body 124. The apparatus 120 preferably is constructed as one unitary piece and made of a metal, such as stainless steel. A smaller rim 139 can be included at the bottom 138 of the head 132. The apparatus 120 is designed to be welded within a rear wall mounting hole of a watertight enclosure like 200, but not screwed into the real wall of a watertight enclosure. Extension 126 is for mounting a back panel for electronics to the rear wall inside an enclosure.

A groove or weld relief located on the outer surface of smaller rim 139 of the head 132 of the apparatus 120 and extends around the entire circumference of the outer surface smaller rim 139 of the head 132. A protrusion, projection, extension or weld point 139 is located at the intersection of the smaller rim 131 and the bottom 138 of the head 132. The weld point 139 provides a pointed projection for a combination of Tungsten Inert Gas (TIG) weld or a Gas Tungsten Arc Weld (GTAW) and fillet weld. The weld point 139 is located to provide an easily accessible location for a TIG weld, that when welded, provides an excelling hermetic and strong seal between the apparatus 120 and the surface to which the bottom 138 of the head 132 is welded. The apparatus 120 preferably is constructed as one unitary piece and made of a metal, such as stainless steel.

FIG. 8a is a front view of a watertight enclosure 140 to be mounted using a mounting apparatus configured in accordance with the present invention. Illustrated are a front door 142 having locking knobs 144 and rear mounting brackets 146. FIG. 8b is a cross-sectional view of the enclosure 140 and mounting brackets 146 shown in and taken along line 8b-8b of FIG. 8a. Shown in FIG. 8b are the mounting brackets 146, the front door 142, a rear wall 148 of the enclosure 140, and a rear panel 150 connected to the rear wall 148 for mounting electrical components.

FIG. 8c is an enlarged view of the circled portion "8c" shown in FIG. 8b. The enclosure 140 is shown and the mounting bracket 146 having a mounting aperture 149 in the bracket 146. The rear panel 150 is shown mounted to the rear wall 148 using the mounting apparatus 200 shown in FIGS. 1a-1c. The bracket 146 is mounted to the rear wall 148 using a bolt 152 screwed into the bore 216 of the fastener 200. The fastener 200 is mounted to the rear wall 148 of the enclosure 140 via a mounting hole 153. A washer 155, preferably metal, is located between the head of the bolt 152 and the bracket 146. The rear panel is mounted to the fastener 200 using a washer 156 and a machine or hex nut 154 located on the extension 204 of the fastener 200.

FIG. 9a is a rear view of a watertight enclosure 140 to be mounted using a mounting apparatus configured in accordance with the present invention. Illustrated are a rear wall 148 and rear mounting brackets 160. FIG. 9b is a cross-sectional view of the enclosure 140 and mounting brackets 160 shown in and taken along line 9b-9b of FIG. 9a. Shown in FIG. 9b are the mounting brackets 160, a front door 142, the rear wall 148 of the enclosure 140, and a rear panel 150 connected to the rear wall 148 for mounting electrical components.

FIG. 9c is an enlarged view of the circled portion "9c" shown in FIG. 9b, wherein the components are shown in an exploded view. The enclosure 140 is shown and the mounting bracket 160 having mounting apertures 161 and 162 in the bracket 160. The rear panel 150 is shown to be mounted to the rear wall 148 using the mounting apparatus 200 shown in FIGS. 1a-1c. The bracket 160 is mounted to the rear wall 148 using a bolt 152 screwed into the bore 216 of the fastener 200. The fastener 200 is to mounted to the rear wall 148 of the enclosure 140 via a mounting hole 153. A washer 155, preferably metal, is to be located between the head of the bolt 152 and the bracket 160. The rear panel 150 is to be mounted to the fastener 200 using a washer 156 and a machine or hex nut 154 located on the extension 204 of the fastener 200. Electrical equipment 151, such as circuit breakers and voltage transformers, is mounted to the rear panel 150 inside the enclosure 140.

FIG. 10a is a front view of a watertight enclosure 140 to be mounted using a mounting apparatus configured in accordance with the present invention. Illustrated are a front door 142 having locking knobs 144 and rear mounting brackets 170. FIG. 9b is a cross-sectional view of the enclosure 140 and mounting brackets 170 shown in and taken along line 9b-9b of FIG. 9a. Shown in FIG. 9b are the mounting brackets 170, the front door 142, a rear wall 148 of the enclosure 140, and a rear panel 150 connected to the rear wall 148 for mounting electrical components.

FIG. 10c is an enlarged view of the circled portion "9c" shown in FIG. 9b. The enclosure 140 is shown and the mounting bracket 170 having a mounting aperture 171 in the bracket 170 for connecting the bracket 170 to a vertical wall. The rear panel 150 is shown mounted to the rear wall 148 of the enclosure 140 using the mounting apparatus 200 shown in FIGS. 1a-1c.

The bracket 170 has a first arm 173 and a second arm 174 connected by a bar 172. A first aperture 171 is for mounting the bracket to a vertical wall, and the second aperture 173 is for mounting the bracket 170 to a rear wall 148 of the enclosure 140. The bracket 170 is mounted to the rear wall 148 of the enclosure 140 using a bolt 152 screwed into the bore 216 of the fastener 200. The fastener 200 is mounted to the rear wall 148 of the enclosure 140 via the aperture 175 in the bracket 170 and an aperture 179 in the rear wall 148 of the enclosure. A washer 155, preferably metal, is located between the head of the bolt 152 and the second arm 174 of the bracket 170. The rear panel 150 is mounted to the fastener 200 using a washer 156 and a machine or hex nut 154 located on the extension 204 of the fastener 200 which passed through an aperture 177 in the rear panel 150.

FIG. 11a is a perspective view of a fastener, stud, or mounting apparatus 300 configured in accordance with another embodiment of the present invention. FIG. 11b is a top view of the apparatus 300, and FIG. 11c is a cross-sectional view of the apparatus 300 shown in and taken along line 11c-11c of FIG. 11b. The apparatus 300 includes a cylindrical body 302 having a diameter D32 and a length L32. The diameter D32 and the length L32 are not any particular value, but D32 typically is around half an inch, and the length L32 typically is around two inches. The body 302 preferably is cylindrical in configuration, but can be other shapes, such as rectangular.

An extension 304 is connected to a bottom 306 of the cylindrical body 302. The extension 304 preferably has a cylindrical configuration and is screw threaded on an outer surface 305 of the extension 304. The extension 304 has a diameter D30 which is less than the diameter D32 of the cylindrical body 302, thus exposing a portion of the bottom 306 to form a ridge or edge 307. The outer surface 308 of the cylindrical body 302 preferably is smooth.

A portion 328 of the outer surface 305 of the extension 304 adjacent to the bottom 306 of the body 302 can be smooth or non-threaded to function as a thread relief 328. The thread relief 328 helps reduce manufacturing cost by removing some of the threading which may not be necessary adjacent to the bottom 306 of the body 302.

A head or rim 310 is formed on top 312 of the cylindrical body 302. The top 322 and bottom 314 of the head 310 preferably are flat and extend beyond the outer surface 308 of the cylindrical body 302 to form a ridge, edge, or ledge 317. A bore 316 having an opening 318 in the head 310 extends into the cylindrical body 302. The internal surface or wall 320 of the bore 316 preferably is threaded to receive a bolt. The head 310 can be any shape, such as circular or square. In FIG. 11b the head 310 has a circular shape.

A groove or weld relief 324 is included in the outer surface 327 of the head 310 of the apparatus and extends around the entire circumference of the outer surface 327 of the head 310. A protrusion, projection, extension or weld point 311 is located at the intersection of the outer surface 327 and the bottom 314 of the head 310. The weld point 311 provides a pointed projection for a Tungsten Inert Gas (TIG) weld or a Gas Tungsten Arc Weld (GTAW). The weld point 311 is located to provide an easily accessible location for a TIG weld, that when welded, provides an excelling hermetic and strong seal between the apparatus 300 and the surface to which the bottom 314 of the head 310 is welded. The apparatus 300 preferably is constructed as one unitary piece and made of a metal, such as stainless steel.

FIG. 12a is a perspective view of a fastener, stud, or mounting apparatus 400 configured in accordance with another embodiment of the present invention. FIG. 12b is a top view of the apparatus 400, and FIG. 12c is a cross-sectional view of the apparatus 400 shown in and taken along line 12c-12c of FIG. 12b. The apparatus 400 includes a cylindrical body 402 having a diameter D36 and a length L34. The diameter D36 and the length L34 are not any particular value, but D36 typically is around half an inch, and the length L34 typically is around two inches. The body 402 preferably is cylindrical in configuration, but can be other shapes, such as rectangular.

An extension 404 is connected to a bottom 406 of the cylindrical body 402. The extension 404 preferably has a cylindrical configuration and is screw threaded on an outer surface 405 of the extension 404. The extension 404 has a diameter D34 which is less than the diameter D36 of the cylindrical body 402, thus exposing a portion of the bottom 406 to form a ridge or edge 407. The outer surface 408 of the cylindrical body 402 preferably is smooth.

A portion 428 of the outer surface 405 of the extension 404 adjacent to the bottom 406 of the body 402 can be smooth or non-threaded to function as a thread relief 428. The thread relief 428 helps reduce manufacturing cost by removing some of the threading which may not be necessary adjacent to the bottom 406 of the body 402.

A head or rim 410 is formed on top 412 of the cylindrical body 402. The top 422 and bottom 414 of the head 410 preferably are flat and extend beyond the outer surface 408 of the cylindrical body 402 to form a ridge, edge, or ledge 417. A bore 416 having an opening 418 in the head 410 extends into the cylindrical body 402. The internal surface or wall 420 of the bore 416 preferably is threaded to receive a bolt. The head 410 can be any shape, such as circular or square. In FIG. 12b the head 410 has a circular shape.

A groove or weld relief 424 is included in the outer surface 427 of the head 410 of the apparatus and extends the entire circumference of the outer surface 427 of the head 410. A protrusion, projection, extension or weld point 411 is located at the intersection of the outer surface 427 and the bottom 414 of the head 410. The weld point 411 provides a pointed projection for a Tungsten Inert Gas (TIG) weld or a Gas Tungsten Arc Weld (GTAW). The weld point 411 is located to provide an easily accessible location for a TIG weld, that when the weld point 411 is melted by welding, provides an excellent hermetic and strong seal between the bottom surface 414 of the head 410 and the surface to which the bottom 414 of the head 410 is welded. The apparatus 400 preferably is constructed as one unitary piece and made of a metal, such as stainless steel.

An O-ring groove 434 is included in the top 422 of the head 410 for holding an O-ring 436. The O-ring 436 is for mounting smaller enclosures when the mounting bracket 146 is mounted on the top of the enclosure. The O-ring 436 is preferably constructed of a flexible material, such as rubber, and is used for keeping contaminants or other undesired material from getting between the mounting bracket 146 and the apparatus 400.

FIG. 13a is a perspective view of a fastener, stud, or mounting apparatus 500 configured in accordance with another embodiment of the present invention. FIG. 13b is a top view of the apparatus 500, and FIG. 13c is a cross-sectional view of the apparatus 500 shown in and taken along line 13c-13c of FIG. 13b. The apparatus 500 includes a cylindrical body 502 having a diameter D40 and a length L36. The diameter D40 and the length L36 are not any particular value, but D40 typically is around an inch, and the length L36 typically is around two inches. The body 502 preferably is cylindrical in configuration, but can be other shapes, such as rectangular.

An extension 504 is connected to a bottom 506 of the cylindrical body 502. The extension 504 preferably has a cylindrical configuration and is screw threaded on an outer surface 505 of the extension 504. The extension 504 has a diameter D40 which is less than the diameter D38 of the cylindrical body 502, thus exposing a portion of the bottom 506 to form a ridge or edge 507. The outer surface 508 of the cylindrical body 502 preferably is smooth.

A portion 528 of the outer surface 505 of the extension 504 adjacent to the bottom 506 of the body 502 can be smooth or non-threaded to function as a thread relief 528. The thread relief 528 helps reduce manufacturing cost by removing some of the threading which may not be necessary adjacent to the bottom 506 of the body 502.

A head or rim 510 is formed on top 512 of the cylindrical body 502. The top 522 and bottom 514 of the head 510 preferably are flat and extend beyond the outer surface 508 of the cylindrical body 502 to form a ridge, edge, or ledge 517. The top 522 of the head 510 is preferably flat and smooth. The head 510 can be any shape, such as circular or square. In FIG. 13b the head 510 has a circular shape.

A groove or weld relief 524 is included in the outer surface 527 of the head 510 of the apparatus 500 and extends around the entire circumference of the outer surface 527 of the head 510. A protrusion, projection, extension or weld point 511 is located at the intersection of the outer surface 527 and the bottom 514 of the head 510. The weld point 511 provides a pointed projection for a Tungsten Inert Gas (TIG) weld or a Gas Tungsten Arc Weld (GTAW). The weld point 511 is located to provide an easily accessible location for a TIG weld, that when welded, provides an excelling hermetic and strong seal between the apparatus 500 and the surface to which the bottom 514 of the head 510 is welded. The apparatus 500 preferably is constructed as one unitary piece and made of a metal, such as stainless steel.

FIG. 14a is a perspective view of a fastener, stud, or mounting apparatus 600 configured in accordance with another embodiment of the present invention. FIG. 14b is a top view of the apparatus 600, and FIG. 14c is a cross-sectional view of the apparatus 600 shown in and taken along line 14c-14c of FIG. 14b. The apparatus 600 includes a cylindrical body 602 having a diameter D44 and a length L38. The diameter D44 and the length L38 are not any particular value, but D44 typically is around half an inch, and the length L38 typically is around two inches. The body 602 preferably is cylindrical in configuration, but can be other shapes, such as rectangular.

An extension 604 is connected to a bottom 606 of the cylindrical body 602. The extension 604 preferably has a cylindrical configuration and is screw threaded on an outer surface 605 of the extension 604. The extension 604 has a diameter D42 which is less than the diameter D44 of the cylindrical body 602, thus exposing a portion of the bottom 606 to form a ridge or edge 607. The outer surface 608 of the cylindrical body 602 preferably is smooth.

A portion 628 of the outer surface 605 of the extension 604 adjacent to the bottom 606 of the body 602 can be smooth or non-threaded to function as a thread relief 628. The thread relief 628 helps reduce manufacturing cost by removing some of the threading which may not be necessary adjacent to the bottom 606 of the body 602.

A head or rim 610 is formed on top 612 of the cylindrical body 602. The top 622 and bottom 642 of the head 610 preferably are flat and extend beyond the outer surface 608 of the cylindrical body 602 to form a ridge, edge, or ledge 617. A bore 616 having an opening 618 in the head 610 extends into the cylindrical body 602. The internal surface or wall 620 of the bore 616 preferably is threaded to receive a bolt. The head 610 can be any shape, such as circular or square. In FIG. 14b the head 610 has a circular shape.

A groove, slot, collar relief, or weld relief 650 is included in the outer surface 608 and at the top 612 of the body 602. The groove or collar slot 650 is located within the body 602 immediately below the head 610. A collar 680 (see FIG. 15) may be included with this embodiment to assist in accurately centering the apparatus 600 within a desired mounting aperture. A protrusion, projection, extension or weld protrusion 668 is located on the bottom 642 of the head 610. The weld protrusion 668 provides a projection for an "Rotating Arc Welder". The weld protrusion point 668 forms a circle on the bottom 642 of the head 610 and surrounds the outer surface 652 of the collar relief 650.

A weld gap relief 667 is formed within the bottom 642 of the head 610 to provide a location and area that eliminates welding past the weld protrusion point 668. The weld gap relief 667 preferably is a semi-circle or arched cutout that circles around the bottom 642 of the head 610 and around the outer surface 652 of the collar relief 650. The weld gap relief 667 is located within the circle on the bottom 642 of the head 610 formed by the weld protrusion point 668. The weld protrusion 668 preferably is pointed or decreasing in width at the weld protrusion 668 extends outwards. An automatic "Rotating Arc Welder" will be used to weld protrusion 668, the hole centering relief 666, and the bottom 642 to an enclosure wall.

The weld protrusion point 666, when melted by welding, provides an excellent hermetic and strong seal between the bottom 642 and the surface to which the bottom 642 of the head 610 is welded. The apparatus 600 preferably is constructed as one unitary piece and made of a metal, such as stainless steel.

FIG. 14d is an enlarged view of the circled portion of the collar relief shown in FIG. 14c. FIG. 14e illustrates an enlarged view of the circled portion in FIG. 14d showing the rounded corner or edge 640 at the intersection of the outer surface 627 and the bottom 642 of the head 610.

FIG. 15a is a perspective view of a fastener, stud, or mounting apparatus 600 shown in FIGS. 14a-14e, wherein a collar 680 is included within the collar relief 650 for centering the apparatus 600 during the process of welding the apparatus within an aperture of an enclosure or other mounting surface. Use of the collar 680 is optional in this embodiment, but using the collar 680 assist the hole centering relief 666 for self-alignment during the process of welding the apparatus 600 within an aperture for mounting.

FIG. 15b is a top view of the apparatus 600, and FIG. 15c is a cross-sectional view of the apparatus 600 shown in and taken along line 15c-15c of FIG. 15b. FIGS. 15a and 15c illustrate the collar 680 within the collar relief 650.

FIG. 15d is an enlarged view of the circled portion shown in FIG. 15c. FIG. 15c illustrates the collar 680 within the collar relief 650. The collar 650 preferably is constructed of a non-conductive material which will prevent welding or arcing in the collar area.

FIG. 15e is enlarged view of the rounded corner or edge 640 at the intersection of the outer surface 627 and the bottom 642 of the head 610 shown in FIG. 15d.

FIG. 16a is a perspective view of a fastener, stud, or mounting apparatus 700 configured in accordance with another embodiment of the present invention. This embodiment is configured for being mounted by stud welding. FIG. 16b is a top view of the apparatus 700, and FIG. 16c is a cross-sectional view of the apparatus 700 shown in and taken along line 16c-16c of FIG. 16b. The apparatus 700 includes a cylindrical body 702 having a diameter D52 and a length L42. The diameter D52 and the length L42 are not any particular value, but D52 typically is around half an inch, and the length L42 typically is around two inches. The body 702 preferably is cylindrical in configuration, but can be other shapes, such as rectangular.

An extension 704 is connected to a bottom 706 of the cylindrical body 702. The extension 704 preferably has a cylindrical configuration and is screw threaded on an outer surface 705 of the extension 704. The extension 704 has a diameter D50 which is less than the diameter D52 of the cylindrical body 702, thus exposing a portion of the bottom 706 to form a ridge or edge 707. The outer surface 708 of the cylindrical body 702 preferably is smooth.

A portion 728 of the outer surface 705 of the extension 704 adjacent to the bottom 706 of the body 702 can be smooth or non-threaded to function as a thread relief 728. The thread relief 728 helps reduce manufacturing cost by removing some of the threading which may not be necessary adjacent to the bottom 706 of the body 702.

A head or rim 710 is formed on top 712 of the cylindrical body 702. The top 722 and bottom 714 of the head 710 preferably are flat and extend beyond the outer surface 708 of the cylindrical body 702 to form a ridge, edge, or ledge 717. A bore 716 having an opening 718 in the head 710 extends into the cylindrical body 702. The internal surface or wall 720 of the bore 716 preferably is threaded to receive a bolt. The head 710 can be any shape, such as circular or square. In FIG. 16b the head 710 has a circular shape.

A groove, slot, collar relief, or weld relief 750 is included in the outer surface 708 and at the top 712 of the body 702. The groove or collar slot 750 is located within the body 702 immediately below the head 710. A collar 780 is included with this embodiment to assist in accurately centering the apparatus 700 within a desired mounting aperture during stud welding. A protrusion, projection, extension, point, or weld protrusion point or tip 774 is located on the bottom 714 of the head 710. The weld protrusion point 774 provides a pointed projection for stud welding. The weld protrusion point 774 forms a circle on the bottom 742 of the head 710 and surrounds the outer surface 708 of the body 702.

FIG. 16d is an enlarged view of the circled portion of the collar relief 750 shown in FIG. 16c. The weld protrusion point 774 also is shown in an enlarged view in FIG. 16d. Welding surface locations 770 and 776 on the bottom 714 of the head 710 are shown in FIG. 16d. Further illustrated are the inside side 778 of the weld protrusion point 774, and the outside side 772 of the weld protrusion point 774. The weld protrusion point 774 preferably is pointed or decreasing in width as the weld protrusion point 778 extends outwards. During stud welding, and due to the gap provided by the weld relief 750, only the weld protrusion point 774 and the welding surface locations 770 and 776 are welded to a mounting or enclosure wall.

The weld protrusion point 774, when melted by welding, provides an excellent hermetic and strong seal between the bottom 742 and the surface to which the bottom 714 of the head 710 is welded. The apparatus 700 preferably is constructed as one unitary piece and made of a metal, such as stainless steel.

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. An apparatus for mounting an enclosure, comprising:
   a cylindrical body having an outer surface, a top, and a flat bottom, wherein the flat bottom is perpendicular to the outer surface of the cylindrical body;
   a head having an outer surface, a top, and a bottom, wherein the bottom of the head is connected to the top of the cylindrical body, and the outer surface of the head extends beyond the outer surface of the cylindrical body, and wherein the head includes a groove in the outer surface of the head;
   a cylindrical extension on the flat bottom of the cylindrical body having an outer diameter less than the outer diameter of the cylindrical body, and an outer surface of the cylindrical extension is threaded, and the flat bottom extends between the outer surface of the cylindrical body and the outer surface of the cylindrical extension; and
   said head including a threaded cylindrical bore having an opening in the top of the head and extending through the head and into the cylindrical body.

2. The apparatus of claim 1, wherein the threaded cylindrical bore extends into at least half the length of the cylindrical body.

3. The apparatus of claim 1, wherein the outer surface of the head has a circular configuration.

4. The apparatus of claim 1, wherein the outer surface of the cylindrical body is completely smooth.

5. The apparatus of claim 1, further comprising:
   a rim around the top of the cylindrical body having an outer surface diameter greater than the outer surface diameter of the cylindrical body and less than the outer surface diameter of the head.

6. The apparatus of claim 1, wherein the outer surface of the cylindrical extension is completely threaded.

7. The apparatus of claim 1, wherein the head has a circular configuration and the groove extends around the entire circumference of the outer surface of the head.

8. The apparatus of claim 1, comprising:
   a transitional slope extending between the outer surface of the head and the outer surface of the cylindrical body.

9. The apparatus of claim 1, further comprising:
   an enclosure having a rear wall with an aperture;
   the cylindrical body of the apparatus passing through the aperture into an interior of the enclosure; and
   the head being welded to an outer surface of the rear wall of the enclosure.

10. The apparatus of claim 9, wherein the head is stud welded to the rear wall.

11. The apparatus of claim 9, wherein the head is welded to the rear wall by rotating arc welding.

12. The apparatus of claim 9, wherein the head is welded to the rear wall by tig and fillet welding.

13. The apparatus of claim 9, wherein the head is welded to the rear wall by tig welding.

14. The apparatus of claim 9, further comprising:
   a rear panel inside the enclosure and secured to the rear wall.

15. The apparatus of claim 14, further comprising:
   electrical equipment mounted on the rear panel.

16. The apparatus of claim 9, further comprising:
   electrical equipment secured within the enclosure.

17. An apparatus for mounting an enclosure, comprising:
   a body having an outer surface, a top, and a flat bottom, wherein the flat bottom is perpendicular the outer surface of the body;
   a head having an outer surface, a top, and a bottom, wherein the bottom of the head is connected to the top of the body, and the outer surface of the head extends beyond the outer surface of the body;
   a cylindrical extension on the bottom of the body having an outer diameter less than the diameter of the body, and an outer surface of the cylindrical extension is threaded, and the bottom of the body extends between the outer surface of the extension and the outer surface of the body; and
   a groove in the outer surface of the head, and the groove extends around an entire circumference of the head.

18. The apparatus of claim 17, further comprising:
   a projection located at an intersection of the outer surface of the head and the bottom of the head.

19. The apparatus of claim 17, wherein the outer surface of the cylindrical extension is completely threaded.

\* \* \* \* \*